United States Patent
Elmeleegy et al.

(10) Patent No.: US 7,916,741 B2
(45) Date of Patent: Mar. 29, 2011

(54) SYSTEM AND METHOD FOR PREVENTING COUNT-TO-INFINITY PROBLEMS IN ETHERNET NETWORKS

(75) Inventors: Khaled Elmeleegy, Houston, TX (US); Alan L. Cox, Houston, TX (US); Tze Sing Eugene Ng, Houston, TX (US)

(73) Assignee: William Marsh Rice University, Houston, TX (US)

( * ) Notice: Subject to any disclaimer, the term of this patent is extended or adjusted under 35 U.S.C. 154(b) by 754 days.

(21) Appl. No.: 11/695,601

(22) Filed: Apr. 2, 2007

(65) Prior Publication Data

US 2008/0240129 A1    Oct. 2, 2008

(51) Int. Cl.
*H04L 12/28* (2006.01)

(52) U.S. Cl. ........ 370/408; 370/401; 370/256; 370/252; 709/252

(58) Field of Classification Search .......... 370/230, 370/254, 328, 351, 226, 219, 256, 395.53, 370/252, 401, 408; 709/238, 224
See application file for complete search history.

(56) References Cited

U.S. PATENT DOCUMENTS

| | | | |
|---|---|---|---|
| 6,219,739 B1 * | 4/2001 | Dutt et al. ................ | 710/311 |
| 6,584,109 B1 | 6/2003 | Feuerstraeter et al. | |
| 6,614,764 B1 * | 9/2003 | Rodeheffer et al. ......... | 370/254 |
| 6,721,275 B1 * | 4/2004 | Rodeheffer et al. ......... | 370/238 |
| 6,857,059 B2 | 2/2005 | Karpoff et al. | |
| 6,898,189 B1 * | 5/2005 | Di Benedetto et al. ...... | 370/256 |
| 7,061,858 B1 * | 6/2006 | Di Benedetto et al. ...... | 370/219 |
| 7,061,875 B1 | 6/2006 | Portolani et al. | |
| 7,102,995 B2 | 9/2006 | Gonda | |
| 7,177,946 B1 | 2/2007 | Kaluve et al. | |
| 7,558,217 B2 * | 7/2009 | Rodeheffer et al. .......... | 370/255 |
| 7,599,284 B1 * | 10/2009 | Di Benedetto et al. ....... | 370/216 |
| 7,653,011 B2 * | 1/2010 | Rahman et al. ............. | 370/256 |
| 2004/0081171 A1 * | 4/2004 | Finn ........................ | 370/395.53 |
| 2004/0179524 A1 | 9/2004 | Sasagawa et al. | |
| 2005/0036500 A1 * | 2/2005 | Rodeheffer et al. .......... | 370/401 |
| 2005/0198232 A1 | 9/2005 | Haalen et al. | |
| 2005/0207348 A1 | 9/2005 | Tsurumi et al. | |
| 2006/0007865 A1 * | 1/2006 | White et al. ................. | 370/238 |
| 2006/0133286 A1 | 6/2006 | Eli-Dit-Cosaque | |
| 2006/0198323 A1 | 9/2006 | Finn | |
| 2006/0233186 A1 | 10/2006 | Portolani et al. | |
| 2006/0253561 A1 | 11/2006 | Holmeide et al. | |
| 2007/0008964 A1 | 1/2007 | Rose et al. | |
| 2007/0025275 A1 | 2/2007 | Tallet et al. | |
| 2007/0206513 A1 * | 9/2007 | Cho et al. ................... | 370/254 |

OTHER PUBLICATIONS

Counting to Infinity Janne Lindqvist Helsinki University of Technology Telecommunications Software and Multimedia Laboratory Sjökulla, Apr. 26/27, 2004.*

K. Birman, A. Schiper, and P. Stephenson. Lightweight casual and atomic group multicast. ACM Transactions on Computer Systems, Aug. 1991, 272-314, 9(3).

(Continued)

*Primary Examiner* — William Trost, IV
*Assistant Examiner* — Emmanuel Maglo
(74) *Attorney, Agent, or Firm* — 24IP Law Group; Timothy R. DeWitt

(57) ABSTRACT

A system and method for preventing a count-to-infinity problem in a network using epochs of sequence numbers in protocol messages to eliminate stale protocol information in the network and to allow the forwarding topology to recover in merely one round trip time across the network.

16 Claims, 22 Drawing Sheets

OTHER PUBLICATIONS

Cisco Systems, Inc., Spanning Tree Protocol Problems and Related Design Considerations. At http://www.cisco.com/warp/public/473/146.html.

Cisco Systems, Inc., Understanding Rapid Spanning Tree Protocol (802.1). At http://www.cisco.com/warp/public/473/146.html.

C. E. Perkins and P. Bhagwat. Higly dynamic Destination-Sequenced Distance-Vector routing (DSDV) for mobile computers. ACM SIGCOMM, Aug. 1994, 234-244.

P. M. Merlin and A. Segall. A Failsafe Distributed Routing Protocol. IEEE/ACM Transactions on Networking. Sep. 1979, 1280-1287, 27(9).

J. J. Garcia-Lunes-Aceves. Loop-Free Routing Using Diffusing Computations. IEEE/ACM Transactions on Networking, Feb. 1993, 130-141, 1(1).

J. M. Jaffe and F. H. Moss. A Responsive Distributed Routing Algorithm for Computer Networks. IEEE Transactions on Communications, Jul. 1982, 1758-1762, 30.

R. Garcia, J. Duato, and F. Silla. "LSOM: A link state protocol over mac addresses for metropolitan backbones using optical ethernet switches" Second IEEE International Symposium on Network Computing and Applications, 2003.

A. Myers, T. S. E. Ng, and H. Zhang. Rethinking the Service Model: Scaling Ethernet to a Million Nodes. Third Workshop on Hot Topics in Networks (HotNets-III), Mar. 2004.

F. D. Pellegrini, D. Starobinski, M. G. Karpovsky, and L. B. Levitin. Scalable cycle-breaking algorithms for gigabit Ethernet backbones. IEEE Infocom 2004, Mar. 2004.

R. Perlman. Rbridges: Transparent routing. IEEE Infocom 2004, Mar. 2004.

T. L. Rodeheffer, C. A. Thekkath, and D. C. Anderson. Smartbridge: A scalable bridge architecture. ACM SIGCOMM 2000, Aug. 2000.

E. W. Dijkstra and C. S. Scholten. Termination detection for diffusing computations. Information Processing Letters, Aug. 1980, 14, 11(1).

S. Sharma, K. Gopalan, S. Nanda, and T. Chiueh. Viking: A multi-spanning-tree Ethernet achitecture for metropolitan area and cluster networks. IEEE Infocom 2004, Mar. 2004.

E. Elnozahy and W. Zwaenepoel, "Manetho:Transparent Rollback-Recovery with Low Overhead, Limited Rollback and Fast Output Commit," IEEE Transactions on Computers, Special Issue on Fault-Tolerant Computing, pp. 526-531 (May 1992).

* cited by examiner

SYSTEM AND METHOD FOR PREVENTING COUNT-TO-INFINITY PROBLEMS IN ETHERNET NETWORKS

STATEMENT REGARDING FEDERALLY SPONSORED RESEARCH OR DEVELOPMENT

The present invention was made with government support under NSF CAREER Award No. CNS-0448546. The government has certain right in the invention.

CROSS-REFERENCE TO RELATED APPLICATIONS

None.

BACKGROUND OF THE INVENTION

1. Field of the Invention

The present invention relates generally to computer networks, and more specifically to the prevention, reduction, and elimination of count-to-infinity problems in Ethernet networks.

2. Brief Description of the Related Art

Computer networks typically comprise a plurality of interconnected computers, computer systems or other devices. The term "device" in the present application is used broadly to refer to all devices, components, entities, or anything else connected to a computer network. A common type of computer network is referred to as a local area network, or "LAN." A LAN typically is a private network within a building, campus, etc. Computer networks such as LANs typically employ a data communication protocol using protocol messages. Multiple LANs may be interconnected with one another via, for example, point-to-point links, microwave transceivers, satellite hookups, or other known methods. One or more intermediate network devices, such as bridges or switches, may be used to couple LANs together and allow the devices on the LANs to exchange information with each other. A bridge or a switch may, for example, be a computer having a plurality of ports that couple the device to the LAN or to an end station. The switching function includes receiving data from a sending device at a source port and transferring that data to at least one destination port for forwarding to the receiving device.

Switches and bridges typically learn which destination port to use in order to reach a particular device by noting on which source port the last message originating from that device was received. This information is then stored by the bridge in a block of memory. Thereafter, when a message addressed to a given device is received on a source port, the bridge looks up the device in its memory and identifies the appropriate destination port to reach that entity. If no destination port is identified from memory, the bridge floods the message out to all ports, except the port on which the message was received.

Most computer networks include redundant communication paths so that failure of any given link does not isolate any portion of the network. The existence of such redundant communication paths, however, may cause the formation of circular paths referred to as "loops" within the network and may result in count-to-infinity problems. Loops can cause problems in networks because data frames in loops may continue indefinitely. Additionally, because switches and bridges replicate data frames whose destination ports is unknown or which are directed to multicast addresses, the existence of loops may cause proliferation of data frames to such an extent that the network becomes overwhelmed.

At the present time, Ethernet is the dominant networking technology in environments ranging from home networks, office networks, data center networks, campus networks, and is becoming more popular in metropolitan-area networks as well. By far the most important reasons for Ethernet's dominance are its high performance-to-cost ratio and its ubiquity. Virtually all computer systems today have an Ethernet interface built in. Ethernet is also fully plug-and-play, requiring no error-prone manual configuration. Moreover, because Ethernet is a layer 2 technology, many layer 3 protocols can easily co-exist on Ethernet networks. Even though Ethernet has all of these compelling benefits, mission-critical applications also demand high network dependability.

Ethernet has a unique combination of features enabling plug-and-play operation. First, Ethernet requires no manual interface address configuration for switches or end systems. Ethernet addresses are simple globally unique identifiers, usually assigned by hardware manufacturers, that do not have any special hierarchical structure for packet forwarding. To deliver a packet from a source to an unknown destination address, Ethernet switches flood the packet throughout the network to ensure it reaches its destination. However, flooding is highly inefficient. Fortunately, an Ethernet switch can observe the flooding of a packet to determine the switch port at which a packet from a particular source address S arrives. This switch port then becomes the outgoing port for packets destined for S and so no flooding is required to deliver future packets to S. Thus, an Ethernet network dynamically discovers the topological locations of interface addresses and dynamically builds packet forwarding tables accordingly. This mechanism is called address learning.

To support the flooding of packets for unknown destinations and address learning, an Ethernet network also dynamically and distributedly computes a cycle-free active forwarding topology using the Rapid Spanning Tree Protocol (RSTP). This active forwarding tree is a logical overlay on the underlying physical topology. Cycles in the underlying physical topology provide redundancy in the event of a link or switch failure. It is critical to not allow cycles in the active forwarding topology. Otherwise, first of all, flooded packets will persist indefinitely in the network cycle causing congestion. Secondly, address learning will not function correctly because a switch may receive packets from a source S via multiple switch ports, making it impossible to build the forwarding table correctly.

RSTP is the current standard Ethernet spanning tree protocol. The Spanning Tree Protocol (STP) is the predecessor of RSTP. The spanning tree protocols are link management protocols that are designed to allow for redundancy while preventing loops in the active topology. Redundancy is important for fault tolerance to link or bridge failures. However, having loops in the active topology can result in packets persisting in the network as Ethernet packets do not have a time-to-live field. The Spanning Tree Algorithm (STA) builds a unique spanning tree out of the network of bridges. The tree is rooted at the bridge with the lowest ID in the network and spans all bridges in the network. A path from any bridge to the root bridge is guaranteed to be of minimum cost. Traffic is forwarded along these paths within the tree. Since the active topology is a tree, it is by definition loop free. Redundant links are kept in a standby mode (blocked). The STA enables these standby links whenever it detects some failure or a change in the cost of some tree path motivating a reconfiguration of the tree.

Protocol messages such as Bridge Protocol Data Units (BPDUs) are used by bridges to exchange information regarding their state. The STA uses the BPDU information to elect the root bridge. Each bridge uses the information conveyed in BPDUs to choose the port which lies on the shortest path to the root bridge (its root port) and the ports that connect it to its children in the spanning tree (its designated ports). The root port is the port that has received the best information for a path to the root. Other ports in the bridge send BPDUs with their path cost to the root to other bridges in the network. Ports that receive inferior information than the one they are sending are chosen to be designated ports. Bridges send a BPDU every HelloTime which acts as a heartbeat. A BPDU has a message age that represents the age of the message and is capped by a MaxAge value, when the message age exceeds the MaxAge value the message gets dropped. Each bridge port caps the number of BPDUs it can transmit every second. It has a counter (TxCount) that keeps track of the transmitted BPDUs, if the counter reaches Transmit Hold Count (TxHoldCount) no more BPDUs can get transmitted during the current second. The counter is decremented by one every second.

A topology change can result in the invalidation of a bridge's learned address location information. This is because a topology change can result in the reconfiguration of the spanning tree which may lead to some network segments to appear as if they have moved from one bridge's perspective. This requires the flushing of the forwarding database that caches stations' locations. STA implements this by making a bridge send a Topology Change (TC) message whenever a port is becoming a part of the active topology, it sends such message on all its ports participating in the active topology. A bridge receiving a TC message forwards it on all its ports participating in the active topology except the one it has received the TC message on. Whenever a bridge sends a TC message on one if its ports, it flushes the cached forwarding information at that port.

The following two sections present the differences between the two spanning tree protocols—the Spanning Tree Protocol (STP) and its successor Rapid spanning Tree Protocol (RSTP)—that are relevant here.

Spanning Tree Protocol (STP)

In the event of a topology change, STP relies on timers before switching ports to the forwarding state. This is to ensure that the new information has been spread across the network. The total waiting time can get up to 50 seconds. This conservative value for the waiting time is to protect against prematurely switching a port to the forwarding state resulting in a forwarding loop. Whenever a bridge gets disconnected from the root bridge, it waits until the information cached at its root port is aged out, then it starts accepting other BPDUs from other bridges to discover another path to the root.

In STP the root bridge sends a hello message every HelloTime. Other bridges relay such messages to their children after adjusting the appropriate fields (ex: message age, path cost, . . . ). A bridge losing a hello message could be due to a problem anywhere along the path to the root.

Rapid Spanning Tree Protocol (RSTP)

RSTP tries to overcome the shortcomings of STP's long convergence time by introducing few optimizations that intend to reduce the convergence time without affecting the functionality of the protocol. For the purpose of understanding the present invention, subset of these optimizations is presented. RSTP relies on a handshake between bridges to transition a designated port into the forwarding state rather than waiting for timers. Unlike in STP where a bridge just forwards the root's BPDU messages, in RSTP every bridge sends a BPDU every HelloTime that acts as a heartbeat indicating the liveness of such bridge. This allows for better detection of failed components. If a bridge misses three consecutive BPDU messages on some port, it assumes that the connection has failed and ages out the information at such port. Physical link failures are detected even faster. If a bridge detects failure at its root port, it falls back immediately to an alternate port if it has any. An alternate port is a port with an alternate path to the root bridge (Cisco Systems, Inc., "Understanding Rapid Spanning Tree Protocol (802.1w)," http://www.cisco.com/warp/public/473/146.html.) A port is chosen to be either an alternate port or a backup port if it is not the root port and receives superior information than the one it is transmitting. In a switched Ethernet a backup port is a port directly connected to another port on the same bridge. For RSTP a topology change event is when a port that was not forwarding switches to be forwarding.

The dependability of Ethernet therefore heavily relies on the ability of RSTP to quickly recompute a cycle-free active forwarding topology upon a partial network failure. Some pathological causes for forwarding loops in RSTP have been previously documented by Cisco (Cisco Systems, Inc., "Spanning Tree Protocol Problems and Related Design Considerations," http://www.cisco.com/warp/public/473/16.html.) However, even under normal operation, RSTP may exhibit a "count-to-infinity" problem which can allow a temporary forwarding cycle to exist in the network for tens of seconds. During this period, network congestion may sharply increase and packets may be forwarded incorrectly. This highly unacceptable behavior was mentioned by Myers et al. (A. Myers, T. S. E. Ng, and H. Zhang, "Rethinking the Service Model: Scaling Ethernet to a Million Nodes," *Third Workshop on Hot Topics in networks* (*HotNets-III*), March 2004.)

A temporary forwarding loop may form when there is a cycle in the physical topology and that this cycle loses connectivity to the root bridge due to a network failure. FIG. 1 gives a simple example of a vulnerable topology having bridges 110, 120, . . . 170. The path between bridge 110 (the root) and bridge 120 does not have to be a direct link. A failure in this path can result in a count-to-infinity situation in RSTP that may create a temporary forwarding loop.

EXAMPLE 1

Counting-to-Infinity

To illustrate this problem we will first give a specific example and relate the behavior to clauses in the IEEE 802.1D (2004) standard (LAN/MAN Standards Committee of the IEEE Computer Society, "IEEE Standard for Local and metropolitan area networks: Media Access Control (MAC) Bridges—802.1D," (2004).) In the next section, a general proof is given.

First we state 8 relevant rules that govern the operation of RSTP. Each rule is identified from the IEEE 802.1D (2004) standard.

1) If a bridge can no longer reach the root bridge via its root port and does not have an alternate port, it declares itself to be the root. Clause 17.6)
2) A bridge sends out a Bridge Protocol Data Unit (BPDU) immediately after the data it is announcing has changed, e.g. when it believes the root has changed or its cost to the root has changed. (Clause 17.8)
3) A designated port becomes the root port if it receives a superior BPDU to what the bridge had received before. That is, this BPDU announces a better path to the root than via the current root port. (Clauses 17.6 and 17.7)
4) An alternate port is a port with an alternate path to the root bridge. A port gets the alternate port role if the BPDU it is to transmit, conveying the cost to the root through itself, is inferior to the one received from its peer. An alternate port caches the information received in the superior BPDU, subjected to a timeout, so that the information can use later if the alternate port becomes the root port. (Clauses 17.6 and 17.7)

5) Bridges (not only the root bridge) send periodic BPDUs, to guard against packet loss and to assist in detecting failed components. (Clause 17.8)

6) A bridge waits for 3 consecutive missing BPDUs from its designated bridge before assuming it to be dead; this is only if the bridge cannot physically detect its failure. After missing three consecutive BPDUs the cached information at the port is aged out. While waiting for the three heartbeats, the bridge generates and transmits its own BPDUs based on its cached information. (Clause 17.21.23)

7) BPDU M1 is superior to BPDU M2 if (Clause 17.5)
   a) M1 is announcing a root with a lower bridge ID than that of M2, or
   b) Both BPDUs are announcing the same root but M1 is announcing a lower cost to get to the root, or
   c) Both BPDUs are announcing the same root and the same cost but M1 was lastly transmitted through a bridge with a lower ID than that last transmitting M2, or
   d) Both BPDUs are announcing the same root, the same cost and are transmitted last through the same bridge but M1 was transmitted from a port with lower ID than the one last transmitted M2, or
   e) Both BPDUs are announcing the same root, the same cost and both were transmitted last through the same bridge and the same port but M1 was received on a port with a lower ID than the one last received M2.

8) The message age is incremented on receipt, and the information discarded if it exceeds the MaxAge. Thus the number of Bridges the information can traverse is limited. (Clause 17.9)

Now consider the example in FIG. 2 showing a network of bridges. Each box 210, 220, 230 and 240 represents a bridge; the top number in the box is the bridge ID, the lower set of numbers represent the root bridge ID as perceived by the current bridge and the cost to this root. The link costs are all 20 (this value is not important). FIG. 2(a) shows the stable active topology at time t1. FIG. 2(b) shows the network at time t2 when the link between bridge 210 and 220 dies. Bridge 220 declares itself to be the root since it has no alternate port (rule (1)). Bridge 220 announces to bridges 230 and 240 that it is the root (rule (2)). At time t3 bridge 230 makes bridge 220 its root as it does not have any alternate port. Bridge 240 however has an alternate port for bridge 210 and incorrectly uses this alternate port as its root port, making bridge 230 its designated bridge (parent in the tree) to the now dead bridge 1 (rule (4)). This is because bridge 240 has no way of knowing that this cached information for the alternate port is stale. At time t4 bridge 240 announces to bridge 220 that it has a path to bridge 210, spreading this stale information and initiating the count-to-infinity (rule (2)). Bridge 220 makes bridge 240 its designated bridge to bridge 210 and updates the cost to bridge 210 to 80 (rule 3). At time t5 bridge 230 sends a BPDU to bridge 240 saying that bridge 220 is the root. Since bridge 230 is bridge 240's designated bridge, bridge 240 accepts this information and makes its cost to bridge 220 to be 40. At time t6 bridge 220 sends a BPDU to bridge 230 saying that it has a path to bridge 210. Bridge 230 makes bridge 220 its designated bridge updating its cost to bridge 210 to be 100. Note that at time t3, bridge 240's port to bridge 220 is in a temporary blocked state but it becomes forwarding as soon as bridge 220 chooses bridge 240 as its designated bridge and put its port to bridge 230 in a temporary blocked state (time t4). Bridge 220's port to bridge 230 becomes forwarding again at time t6 when bridge 230 confirms that bridge 220 is its designated bridge. Thus at time t6, all ports are forwarding creating a forwarding loop.

When bridge 220 receives the next BPDU from bridge 240, bridge 220 will transmit BPDUs to reassert its root status. However, the stale information about bridge 210 is still being transmitted by bridge 230 to bridge 240 and continues to go around the cycle in a count-to-infinity situation until this stale information reaches its MaxAge which is supposed to be a timeout with a default value of 20 seconds. However, in reality, the age of a message is incremented by 1 only when it is passed. Thus, a MaxAge of 20 only ensures that the stale information cannot be passed around more than 20 times. As a result, the stale information can actually persist in the network for longer than 20 seconds. (rules 6 and 8).

As the fresh and stale BPDUs cycle around the loop, the bridge ports will eventually reach their TxHoldCount limit. Subsequently, a BPDU will only be transmitted by a bridge port when the transmit counter is decremented which happens once a second when the bridge's internal timer ticks. Then depending on when and where the fresh and stale information get stuck in the loop and the clock skew of the bridges, the stale information may catch up with and eliminate the fresh information. When this happens, all the bridges in the loop will believe in the stale information until its MaxAge is reached, all ports in the loop forward packets, thus creating a forwarding loop that lasts until count-to-infinity terminates. On the other hand, the fresh information may catch up with the stale one ending the count-to-infinity.

Counting-to-Infinity: The General Case

We now give a general proof that whenever a network is partitioned, if the partition that does not contain the previous root bridge has a cycle, there exists a race condition that can result in the count-to-infinity behavior which may lead to a temporary forwarding loop. The proof proceeds by first demonstrating that one bridge in the partition without the previous root bridge must declare itself the new root and start transmitting BPDUs. These BPDUs will race around the cycle. Depending on the outcome of the race, count-to-infinity may occur.

Lemma 1: If a network is partitioned, the partition without the previous root bridge must contain a bridge that has no alternate port.

Proof: Consider the general network scenario 300 illustrated in FIG. 3. The dotted lines represent network paths that may contain unknown intermediate hops. A solid line represents a direct bridge to bridge connection. Before the partition, the network has a root bridge 310 and a plurality of bridges 320. Every bridge $N_x$ has a certain shortest path to the root bridge 310 with a cost of $c_x$. Upon the partition, bridges $N_0$ to $N_k$ form a partition that has no connectivity to the root bridge 310.

The proof is by contradiction. Let us assume that bridges $N_0$ to $N_k$ all have one or more alternate ports to R immediately after the partition. Consider bridge $N_0$. Since $N_0$ has at least one alternate port, it must be directly connected to another bridge in the partition, say $N_1$, which has an alternate path to the root bridge 310 that does not include $N_0$. Without loss of generality, assume the BPDU sent by $N_1$ is superior than the BPDU sent by $N_0$. Thus, $N_0$ has an alternate port through $N_1$. Similarly for $N_1$, it must have an alternate port to root bridge 310 via another bridge, say $N_2$, and $N_2$'s BPDU is superior to $N_1$'s so $N_1$ has an alternate port through $N_2$. This argument applies till bridge $N_{k-1}$ However, since there is a finite number of bridges, $N_k$ must obtain an alternate port to bridge 310 via one of the bridges $N_0$ to $N_{k-2}$. However, this is impossible because $N_k$'s BPDU is superior to the BPDUs from all other bridges. Thus, we have a contradiction.

Because there exists at least one bridge in the partition that does not contain the previous root that has no alternate port, by the RSTP protocol (rule (1)), this bridge, when it detects that its root port is no longer valid, it must declare itself the new root and begin sending BPDUs announcing itself the root. These BPDUs will be flood along the partition. The next lemma shows that if the partition contains a cycle, then there exists a race condition such that if the BPDU arrives at a bridge with an alternate port via its root port first, stale information cached at its alternate port about the previous root will be spread into the network, creating the count-to-infinity situation.

Lemma 2: If a network is partitioned, and the partition without the previous root bridge contains a cycle, a race condition exists that may lead to count-to-infinity which can create a temporary forwarding loop.

Proof: From Lemma 1, in the partition containing the cycle, one or more bridges without alternate port must eventually declare themselves as roots and send their own BPDUs to the rest of the bridges in the partition. In addition, before the partition, the cycle must contain one or more bridges with an alternate port to the root. This is because, before the partition, assuming no forwarding loop exists, the cycle must be cut in the active forwarding topology by RSTP. An alternate port therefore exists at the link where the cycle is cut.

Now consider FIG. 4 where the link between bridges 410 and 420 is where an alternate port exists in the cycle. Bridge 410 is connected to the rest of the loop with a root port on its left and has a designated port that links it to bridge 420. Bridge 420 is connected to the loop by its root port on its right and connected to bridge 410 by an alternate port. After the partition, BPDUs from bridges declaring themselves to be root will race around the cycle.

If bridge 420 receives such BPDUs on its root port before receiving them on its alternate port, it will find that its alternate port has superior cached information suggesting a path to a superior root that is no longer reachable. Thus bridge 420 will then make the alternate port its root port and start sending BPDUs conveying the information it has cached to bridges on its right as it believes it has superior information than the one it received. Afterwards, bridge 420 would get BPDUs on its new root port through bridge 410 from bridges declaring themselves to be root. Bridge 420 will then know that the information at its root port is stale and will accept the new information and also forward it to its right. This will result in a situation where fresh BPDUs chasing stale BPDUs around the loop resulting in a count-to-infinity situation.

On the other hand if bridge 420 receives the fresh BPDUs from other bridges declaring themselves to be root on its alternate port first before receiving them on its root port, the stale information at the alternate port will be discarded and no count-to-infinity would occur.

Count-to-Infinity may even occur without a network partition. For example if the loop in the physical topology loses its cheapest path to the root and picks another path with a higher cost. This new information will race around the loop until it reaches an alternate port caching stale, but superior information. Again this stale information will chase the new information around the loop counting to infinity. This will keep going until the stale information reaches its MaxAge, or the cost reported by the stale information increases to exceed that of the new information. This is because the cost reported by the stale information increases while it is circling around the loop, counting to infinity.

In summary, the problem is bridges cache information from the past at alternate ports, then use it blindly in the future if the root port becomes invalid, without knowing whether this information is stale or not. Then the bridge starts spreading this stale information to other bridges via its BPDUs.

Coping with Counting-to-Infinity in RSTP

A variety of systems and/or methods have been proposed for coping with the count-to-infinity problem in RSTP. Some of those are described herein.

First, in RSTP, BPDUs include a Message Age that is initialized to zero by the root. Every bridge that passes the BPDU along the network increments the BPDU's Message Age by one before forwarding it. When a BPDU's Message Age reaches MaxAge it gets dropped. The value of MaxAge prescribed by the standard is 20. This results in stale information eventually getting flushed out of the network. Thus, one potential strategy to cope with the counting-to-infinity problem is to reduce MaxAge. Unfortunately, reducing MaxAge under the current RSTP standard also unnecessarily limits the network diameter and thus the scalability of Ethernet.

But much more importantly, the MaxAge parameter does not effectively bound the time counting-to-infinity can persist. One may think that count-to-infinity can last for at most a few milliseconds as the stale BPDUs are dropped after they traverse at most 20 hops around the loop. Unfortunately RSTP has a per port Transmit Hold Count (TxHoldCount) that limits the number of transmitted BPDUs per port per second. Each time a BPDU is transmitted through a port, the transmit count is incremented until it reaches the TxHoldCount, where no more BPDUs can be transmitted. The transmit count is decremented every clock tic, which occurs every one second. The purpose of such limit is to protect a bridge from being overwhelmed by processing a lot of BPDUs, specially if the bridge is serving multiple VLANs. The TxHoldCount exacerbates the count to infinity problem by delaying the transmission of the BPDUs. Depending on the complexity of the network topology, the volume of BPDUs will vary. Thus the time it takes for a BPDU to reach MaxAge also varies with network complexity.

To illustrate this problem, we simulate a network of 16 bridges that is initially configured in a ring topology. Then we randomly add redundant links to increase complexity until we reach a fully connected graph. After adding each link we simulate the failure of the root bridge and measure the convergence time. What we mean by convergence time is the time, measured in seconds, after which all the bridges in the network have agreed on the same correct root bridge. FIG. 5 shows that adding more redundant links dramatically increases the convergence time. The reason for that is adding more redundant links results in more alternate ports per bridge. If the root bridge is unreachable and the bridge has many alternate ports, it may try all its alternate ports one after another. Every time a bridge switches to a new alternate port, this port goes forwarding triggering a topology change event that makes the bridge send topology change message on all its forwarding ports. For example in FIGS. 2(*c*) and (*d*), when bridge 240 takes its alternate port as its new root port, a topology change is triggered. Bridge 240 sends a topology change message on all its forwarding ports. Thus switching between a few alternate ports can result in all the ports in the active topology reaching their TxHoldCount limit due to the transmissions of all the topology change messages. This increases the convergence time as BPDU updates cannot be transmitted promptly.

Another potential way to cope with RSTP's counting-to-infinity is to increase the transmit hold count TxHoldCount at the expense of increasing the BPDU processing load on bridges. One may think that by increasing the TxHoldCount, the duration a stale BPDU can persist in a network should be proportionally reduced. Unfortunately, that is not the case in reality.

To illustrate, we simulate a fully connected network of four bridges and measure the convergence time after the death of the root bridge. FIG. 6(a) shows the convergence times for ten runs when varying the TxHoldCount according to the value range allowed by the standard. We can see that the convergence time exhibits a multi-modal behavior. Even when the TxHoldCount is increased to 10, the worst case convergence time is still 8 seconds, not the 10 times improvement one might expect when comparing to a TxHoldCount of 1. Clearly, the benefit of increasing TxHoldCount is non-linear and limited. This is because once the transmit count reaches the TxHoldCount limit, it gets decremented by one every second allowing for only one BPDU to be transmitted per second irrespective of the TxHoldCount value. FIG. 6(b) shows the measured convergence time for a simpler topology, namely the topology in FIG. 2(a). Even in this simple topology, increasing the TxHoldCount does not dramatically improve convergence time.

A third potential way to cope with RSTP's counting-to-infinity is to avoid it by using restricted network topologies in which the problem cannot manifest. Since counting-to-infinity can happen when there is a cycle in the physical topology and this cycle gets partitioned from the root, topologies having physical cycles that can get partitioned from the root should be avoided when using RSTP bridges.

A safe topology therefore should have every cycle pass through the root bridge. A family of topologies that satisfy this requirement and is not prone to partitioning after the death of the root bridge is topologies having all their cycles intersect at two bridges in which one is the root bridge. FIG. 7 is an example of such topologies. In this example the root should be selected among bridges 710 and 720. This can be done by manipulating the bridge's priority to guarantee that it has the lowest bridge ID in the network. A ring topology is a special case of such family of topologies.

A fourth potential solution was proposed in U.S. Pat. No. 7,061,875. Specifically, it was proposed that a "loop guard" be used to prevent a port from becoming a designated port based upon a message age timer. In other words, a particular port stops receiving BPDU's, that port is placed in a "loop inconsistent" state that prevents that port from transitioning into a forwarding port state until it begins receiving BPDU's again.

SUMMARY OF THE INVENTION

In a preferred embodiment, the present invention is a system and method for reducing count-to-infinity problems in Ethernet networks using epochs of sequence numbers in protocol messages to eliminate stale protocol information in the network and to allow the forwarding topology to recover in merely one round trip time across the network. In one embodiment, the present invention is a method for preventing a count-to-infinity problem in a network having a plurality of network bridges. The method comprises the steps of associating an epoch number with a plurality of messages sent in said network and, for each message having an epoch number received at a network bridge, applying a function to determine whether the message is stale based upon the epoch number associated with the message. An epoch number may be associated with each message in the network.

In another preferred embodiment, the present invention is a method for preventing count-to-infinity problems in a network having a plurality of network bridges. A network bridge has a first sequence number, a current sequence number and a current root identifier stored in memory. A received protocol message, which may be a BPDU, comprises a message sequence number and a message root identifier, the message root identifier being different than the current root identifier of the network bridge. When a message is received at a network bridge, the first step is to compare the message root identifier to the bridge's current root identifier. If the message root identifier is the same as the bridge's current root identifier, the message is treated in accordance with standard RSTP. If the message root identifier is different that the bridge's current root identifier, the message sequence number is compared to the first sequence number. If the message sequence number is less than the first sequence number, the message is discarded. If the message sequence number is greater than or equal to the bridge's first sequence number, the message sequence number is compared to the bridge's current sequence number. If the message sequence number is less than the current sequence number the message root identifier is compared to the current root identifier. If the message root identifier is not superior to bridge's current root identifier, the message is discarded. If the message root identifier is superior to bridge's current root identifier, a new first sequence number equal to the message sequence number, a new current sequence number equal to the message sequence number, and a new root identifier equal to the message root identifier are stored in the bridge memory.

If the message sequence number is greater than or equal to the current sequence number, the message root identifier is compared to the current root identifier. If the message root identifier is superior to the current root identifier, a new first sequence number equal to the message sequence number, a new current sequence number equal to the message sequence number, and a new root identifier equal to the message root identifier are stored in the bridge memory. If the message sequence number is greater than or equal to the current sequence number, the message root identifier is compared to the current root identifier. If the message root identifier is not superior to the current root identifier, a new current sequence number new than said message sequence number (for example, said message sequence number plus one, is stored and the message with the new current sequence number is forwarded.

In another embodiment, the present invention is a method for preventing a count-to-infinity problem in a network having a plurality of network bridges in which the method comprises the steps of receiving a message at a network bridge, the network bridge having a current epoch number and a current root identifier stored in memory and the received message comprises a message epoch number and a message root identifier, the message root identifier being different than the current root identifier of the network bridge, comparing the message epoch number to the current epoch number, dropping the message if the message epoch number is older than the stored epoch number, comparing the stored root identifier to the message root identifier if the message epoch number is not older than the current epoch number, dropping the message if the message epoch number is equal to the current epoch number and the current root identifier is superior to the message root identifier, changing the current root identifier to the message root identifier if the message epoch number is equal to the current epoch number and the message root identifier is superior to the current root identifier, changing the current epoch number to the message epoch number and changing the current root identifier to the message root identifier if the message epoch number is newer than the current epoch number and the message root identifier is superior to the current root identifier, and changing the current epoch number to a new epoch number and changing the current root identifier to a new root identifier if the message epoch number is newer than the current epoch number and the current root identifier is superior to the message root identifier. The method may further comprise the steps of determining whether said network bridge has an alternate port, if the network bridge has an alternate port, the message epoch number is newer than the current epoch number and the current root identifier is superior to the message root identifier, changing the current root identifier to a root identifier of the alternate port, and if the network bridge does not have an alternate port, the message epoch number is newer than the current epoch number and the current root identifier is superior to the message root identifier, changing the current root identifier to a root identifier of the network bridge.

Still other aspects, features, and advantages of the present invention are readily apparent from the following detailed description, simply by illustrating a preferable embodiments and implementations. The present invention is also capable of other and different embodiments and its several details can be modified in various obvious respects, all without departing from the spirit and scope of the present invention. Accordingly, the drawings and descriptions are to be regarded as illustrative in nature, and not as restrictive. Additional objects and advantages of the invention will be set forth in part in the description which follows and in part will be obvious from the description, or may be learned by practice of the invention.

BRIEF DESCRIPTION OF THE DRAWINGS

For a more complete understanding of the present invention and the advantages thereof, reference is now made to the following description and the accompanying drawings, in which.

DETAILED DESCRIPTION OF THE PREFERRED EMBODIMENTS

Figure 1:
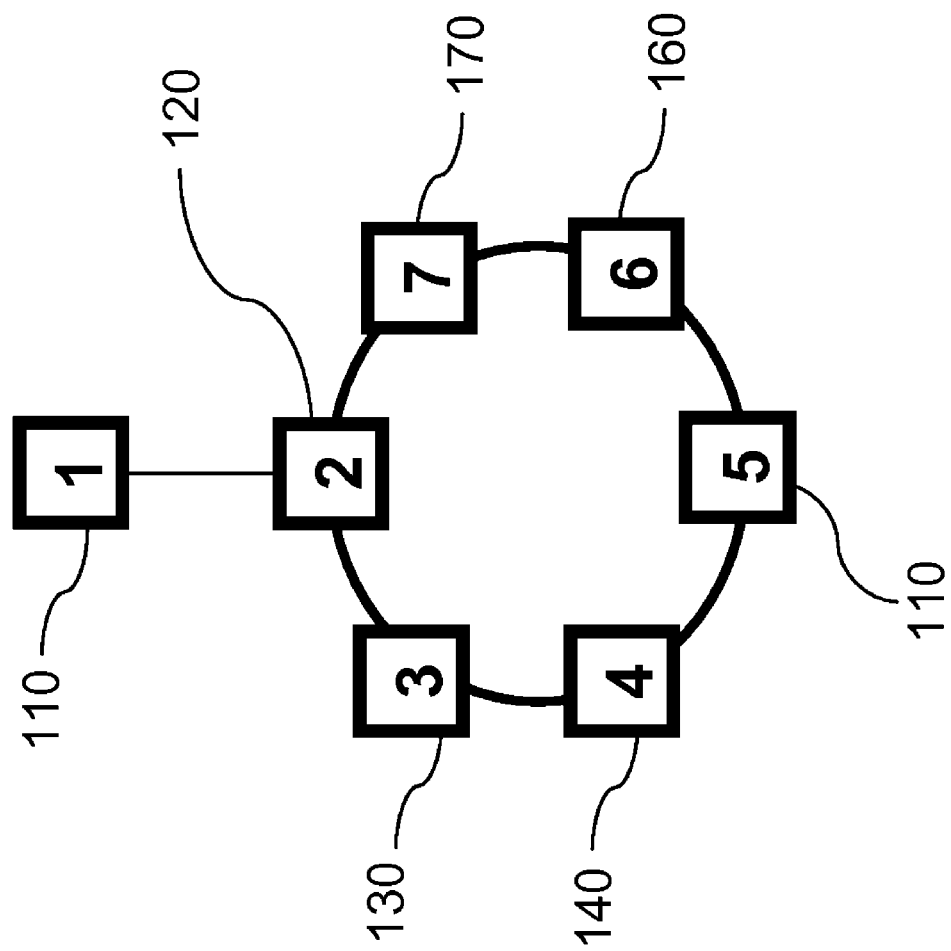
FIG. 1 illustrates a simple topology vulnerable to temporary forwarding loop.

The present invention, which may be referred to as RSTP with Epochs, solves the count to infinity problem discussed above. The RSTP with Epochs protocol of the present invention is an extension to the RSTP protocol that relies on the root adding a sequence number to each BPDU that it generates. Designated bridges generate and transmit their own BPDUs based on the latest root's BPDU and including the root's latest sequence number. The purpose of these sequence numbers is to identify stale BPDUs or stale cached information from a retired root. However sequence numbers by themselves are not sufficient. For example, consider in a network of bridges where there is the old root bridge A and a new bridge B with lower bridge ID than A that has just joined the network. Bridge B is now eligible to become the root, so when it receives a BPDU from A, it starts sending out its own using a sequence number higher than the one in A's BPDU. This is to override A's BPDUs and assert itself as the new root causing A to back-off. However, by the time B's BPDU reaches A, A may have sent out one or more BPDUs having higher sequence numbers. Thus A will view B's BPDUs as stale and it will not back off and the network will not converge.

Using epochs solves this problem. An epoch is an interval starting when the true root bridge achieves root status and ends with another bridge contending for root status. Another bridge will contend for root status because it did not hear from the previous root, or because it finds its bridge ID to be lower than that of the previous root. A bridge may not hear from the previous root if the previous root has retired, or the root may still be reachable but the contending bridge has lost its path to the root without having any other alternate ports. A bridge may find it has a lower bridge ID than the root because it has just joined the network and its bridge ID is lower than the current root's bridge ID, so it's eligible to be the new root. If the previous root has retired and the contending bridge is eligible to be the root, the new root will use a sequence number higher than the highest sequence number it received from the retired root signaling a new epoch with a new root bridge. If the old root is reachable and is still eligible to be the root, it pumps up its sequence number to override the contending bridges' sequence numbers to re-take the network and this signals a new epoch as well but with the same root bridge as in the previous epoch. Each bridge has a local representation of an epoch with an interval of sequence numbers it heard from the same root bridge. The interval is represented by two sequence numbers, FirstSeqno and CurrentSeqno. FirstSeqno is the first sequence number this bridge has heard from the current root. CurrentSeqno is the current or latest sequence number the bridge has heard from the root. Back to the example given above, epochs allow the new root B to catch up with the old root's sequence numbers to eventually be able to take over the network. When B's BPDU reaches A, A may have already sent BPDUs with higher sequence numbers, but since B's BPDU sequence number lies within the interval representing the current epoch, A realizes that B coexists with it in the same epoch and thus it backs away.

In detail, the RSTP with Epochs protocol of the present invention modifies the RSTP protocol as follows:

1) The periodic BPDUs sent by the root have increasing sequence numbers (BPDU.Seqno), where the period is typically a HelloTime. The sequence number is incremented by the root bridge at the beginning of each period. Children bridges generate their BPDUs including the root's latest sequence numbers.

2) Each bridge records two values, FirstSeqno and CurrentSeqno, the first and last sequence numbers, respectively, that it has received from the current root bridge. These two sequence numbers define the current epoch. The purpose of this epoch is to identify stale BPDUs. A BPDU with a sequence number less than the recorded first sequence number must be a stale BPDU belonging to an earlier epoch.

3) Bridges disregard the sequence numbers when comparing BPDUs declaring the same root. However, if a BPDU arrives declaring a different root than the one perceived by the bridge, the bridge checks if the BPDU's sequence number is larger than the last recorded sequence number for the perceived root. If this is the case, it signals the beginning of a new epoch. The new epoch has a different root declared by the received BPDU. The first and last sequence numbers are set to the sequence number reported by the received BPDU. On the other hand, if the sequence number reported by the BPDU is larger than or equal to the first recorded sequence number but smaller than or equal to the largest recorded sequence number of the current root, the bridge with the lowest ID—among the ones declared by the BPDU and the current root—is deemed superior; and it is the one accepted by the bridge as the current root.

4) When a bridge detects disconnection from its designated bridge, it first checks to see if it has any alternate ports. If it does, it adopts one of these alternate ports as its new root port. However, if the bridge does not have any alternate ports, it declares itself as the new root and starts broadcasting its own BPDUs that have a sequence number larger than the last sequence number that it received from the old root.

5) If a bridge receives a BPDU declaring another bridge with an inferior bridge ID to its own as the root, the bridge starts sending BPDUs declaring itself as the root. These BPDUs are given a sequence number that is larger than that received from the inferior bridge. When one of these BPDUs reaches the inferior bridge, it will stop declaring itself as the root.

Figure 8:
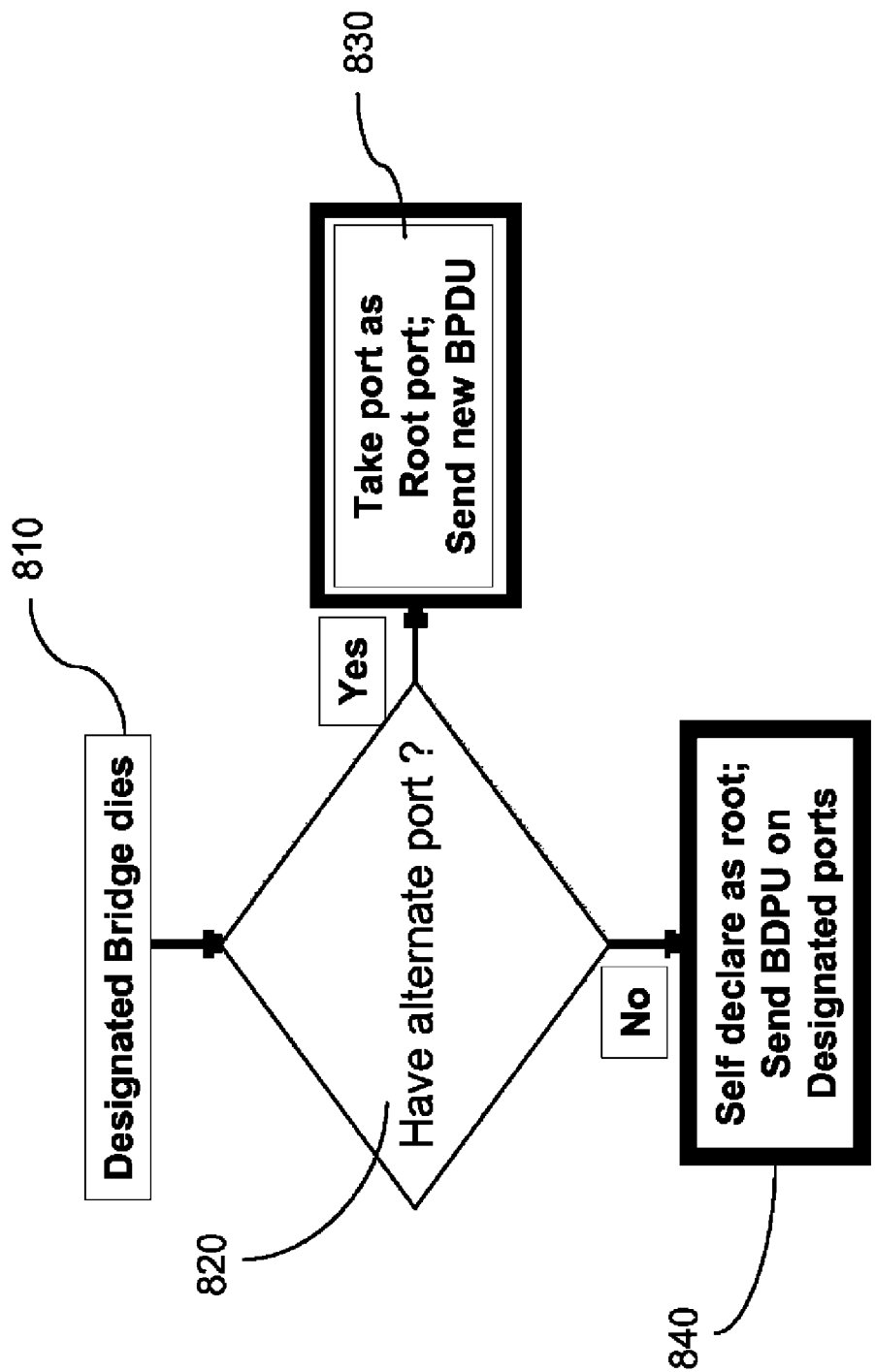
FIG. 8 shows the handling the death of the designated bridge.

FIG. 8 explains how a bridge handles the event of the death of its designated bridge; this is the same way an RSTP bridge handles this event. Specifically, if a designated bridge dies 810, a determination 820 is made as to whether there is an alternate port. If an alternate port is available, the alternate is taken at the root port and a new BPDU is sent out 830. If no alternate port is available, the bridge declares itself the root and sends the BPDU on its designated ports.

Figure 9:
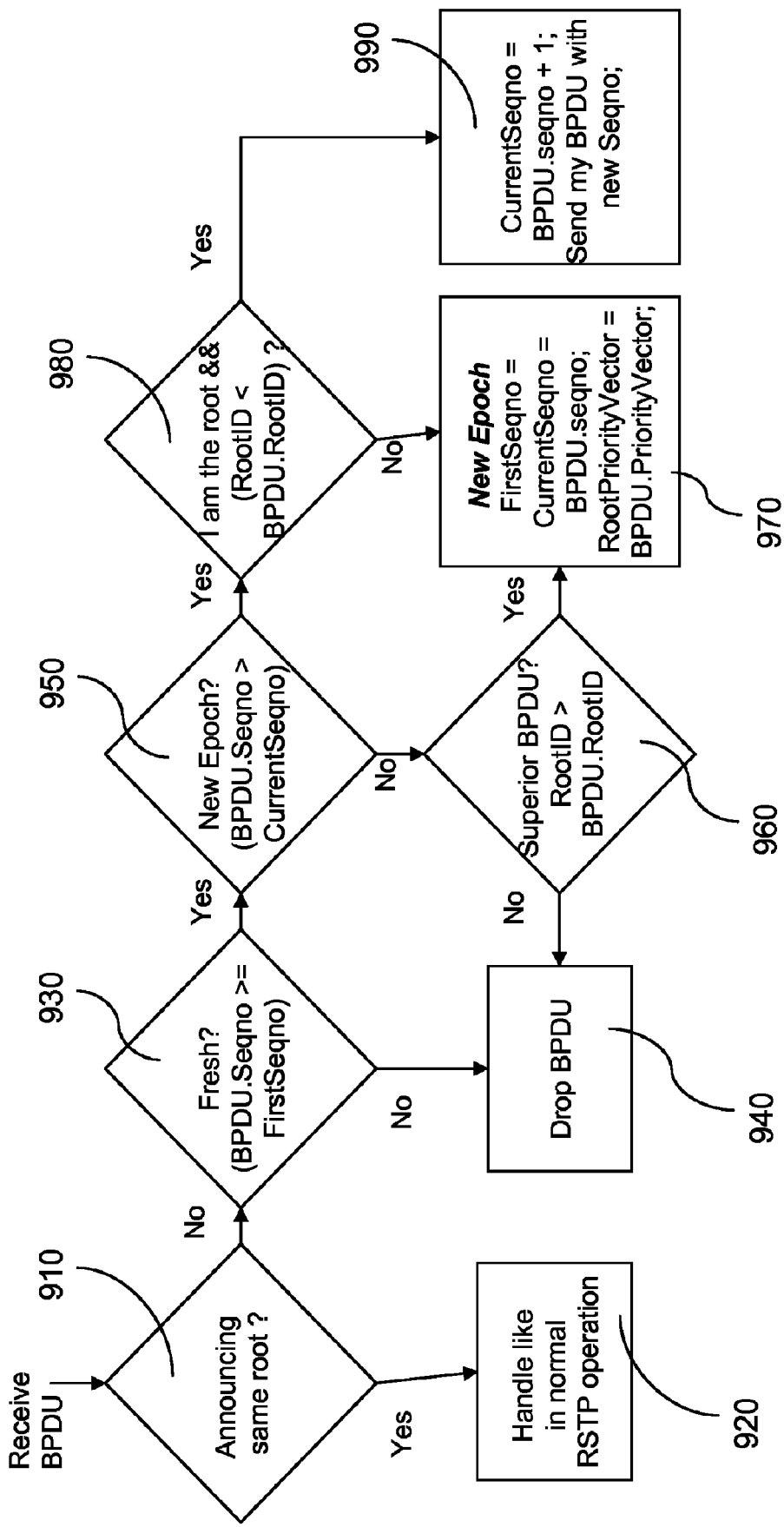
FIG. 9 shows the handling of the reception of a BPDU in the RSTP with Epochs protocol.

FIG. 9 explains the handling of receipt of a BPDU for the RSTP with Epochs protocol of the present invention. When a BPDU is received, a determination is made at step 910 as to whether the BPDU is announcing the same root. If it is announcing the same root as previous BPDU's, the bridge handles the BPDU like it would in normal RSTP operation 920. If the BPDU announces a new root, at step 930 a determination is made as to whether the sequence number of the received BPDU is greater than the first sequence number received from the prior root. At step 940, if the sequence number of the received BPDU is less than the first sequence number received from the prior root, the BPDU is dropped as stale. If the sequence number of the received BPDU is greater than the first sequence number from the prior root, a determination is made at step 950 as to whether the sequence number of the received BPDU is greater than the current sequence number from the prior root. If the sequence number of the received BPDU is less than the current sequence number received from the prior root, a determination is made at step 960 whether the received BPDU has a root that is superior to the prior root. If not, the BPDU is dropped as stale. If the root of the received BPDU is superior to the prior root, a new epoch is declared at step 970. The first sequence number and current sequence number are set to equal the sequence number of the received BPDU and the root priority vector is set to the root of the received BPDU. At step 950 if the sequence number of the received BPDU is greater than the current sequence number of the prior root, a determination is made at step 980 whether the current root is superior to the root identified by the received BPDU. If the current root is not superior to the root of the received BPDU, a new epoch is declared at step 970. If the current root is determined at step 980 to be superior to the root of the received BPDU, the current sequence number of the current root is set to the sequence number of the received BPDU plus 1 and the BPDU is sent with the new sequence number at step 990.

Sequence numbers can wrap around. The way to deal with that is to consider zero as bigger than the largest sequence number. A side effect of doing that is when a new bridge joins the network starting off with sequence number zero may be able to temporarily take over the network although it has a bridge ID higher than the legitimate root. When the legitimate root receives the new bridge's BPDU, it can then pump up its sequence number and re-take the network. This may result in a brief period of disconnectivity. A work around this problem is to make a new bridge joining the network listen for a while for BPDUs, if it receives a BPDU from a superior root, it should not send its own BPDU. If no superior BPDUs are received the new bridge can then start sending its own BPDU declaring itself to be the root.

The advantage of RSTP with Epochs when compared to RSTP is that it avoids count-to-infinity. On the other hand, its disadvantage when compared to RSTP is the small overhead that can result from its comparative pessimism. To elaborate, let us reconsider the topology in FIG. 1. Suppose the link between bridge 120 and 130 dies. Under both protocols, bridge 130 will emit a new BPDU. The difference is, in RSTP, the propagation of this BPDU will be stopped once it reaches bridge 150 because bridge 150 has an alternate port to the root via bridge 160. In effect, by default RSTP assumes that the root bridge is still alive. In contrast, in RSTP with Epochs, this BPDU creates a new epoch and thus is superior to the cached information at the alternate port at bridge 150. Consequently the propagation will not be stopped until it reaches bridge 110. In effect, RSTP with Epochs pessimistically assumes that the root bridge is inaccessible.

In absence of a count-to-infinity, both RSTP and RSTP with Epochs generate the same topology change events and thus generate the same number of BPDUs signaling topology change events. This is because a topology change event occurs when a port goes forwarding and since both protocols converge at the same topology, switching the same ports to forwarding and thus generating the same topology change events. In case of a count-to-infinity in RSTP, some ports may go to forwarding temporarily generating some extra topology change events as in FIG. 2.

In this section, we provide some suggestions on how to allow RSTP with Epochs bridges of the present invention to interoperate with legacy RSTP and STP bridges. The basic mechanism is similar to that used by RSTP to interoperate with STP. First, the RSTP with Epochs protocol should be assigned a new protocol version number. A BPDU sent by a bridge carries the version number of the corresponding protocol used. A BPDU with an unknown version number will be discarded by the receiving bridge. At start up, a RSTP with Epochs bridge will try sending RSTP with Epochs BPDUs. If the network peer is a legacy bridge, these BPDUs will be ignored. Eventually, the RSTP with Epochs bridge will receive legacy BPDUs from the legacy peer bridge, at such time it can recognize the protocol used by the peer and fall back to the appropriate legacy protocol. To translate a RSTP with Epochs BPDU into a legacy BPDU, the epoch sequence number is simply stripped from the BPDU. These mechanisms allow a mixture of RSTP with Epochs, RSTP, and STP bridges to co-exist in a network.

A careful design of the network can also help to extract the most benefits from RSTP with Epochs bridges even when they are mixed with legacy bridges. First, redundancy is most critical in the core of the network. Thus, RSTP with Epochs bridges should be used in the network core, where many redundant links can be safely introduced. Legacy bridges can be used as traffic aggregation trees at the edge of the network. These aggregation trees contain no cycles and thus are safe. To ensure an RSTP with Epochs bridge will be elected as the new root upon a failure, RSTP with Epochs bridges should be assigned the lowest IDs among all bridges in the network.

In this section we evaluate different aspects of the RSTP and the RSTP with Epochs protocols. To evaluate RSTP and RSTP with Epochs protocols we used the simulator used by. We extended it to include the RSTP with Epochs implementation, to have desynchronized bridge clocks, and also added some instrumentations to allow us to collect information required in our experiments. The simulator uses a MaxAge value of 20, HelloTime of 2 seconds and a TxHoldCount of 3 unless otherwise stated. Not all bridges start together at time zero. Instead each bridge starts with a random offset from time zero that is a fraction of the HelloTime. Bridges are connected to each other by links with 100 microsecond of total delay (propagation and transmission delay). Only protocol BPDU packets are simulated. No user data packet traffic is simulated.

In this subsection we compare the convergence times of RSTP and RSTP with Epochs in the event of failure in three families of topologies. What we mean by convergence time is the time it takes the network until all its bridges have converged to the correct active topology. For each family of topologies we vary the number of bridges in the network and measure the corresponding convergence time. For each data point we repeat the experiment 100 times and report the range of values measured.

Figure 10:
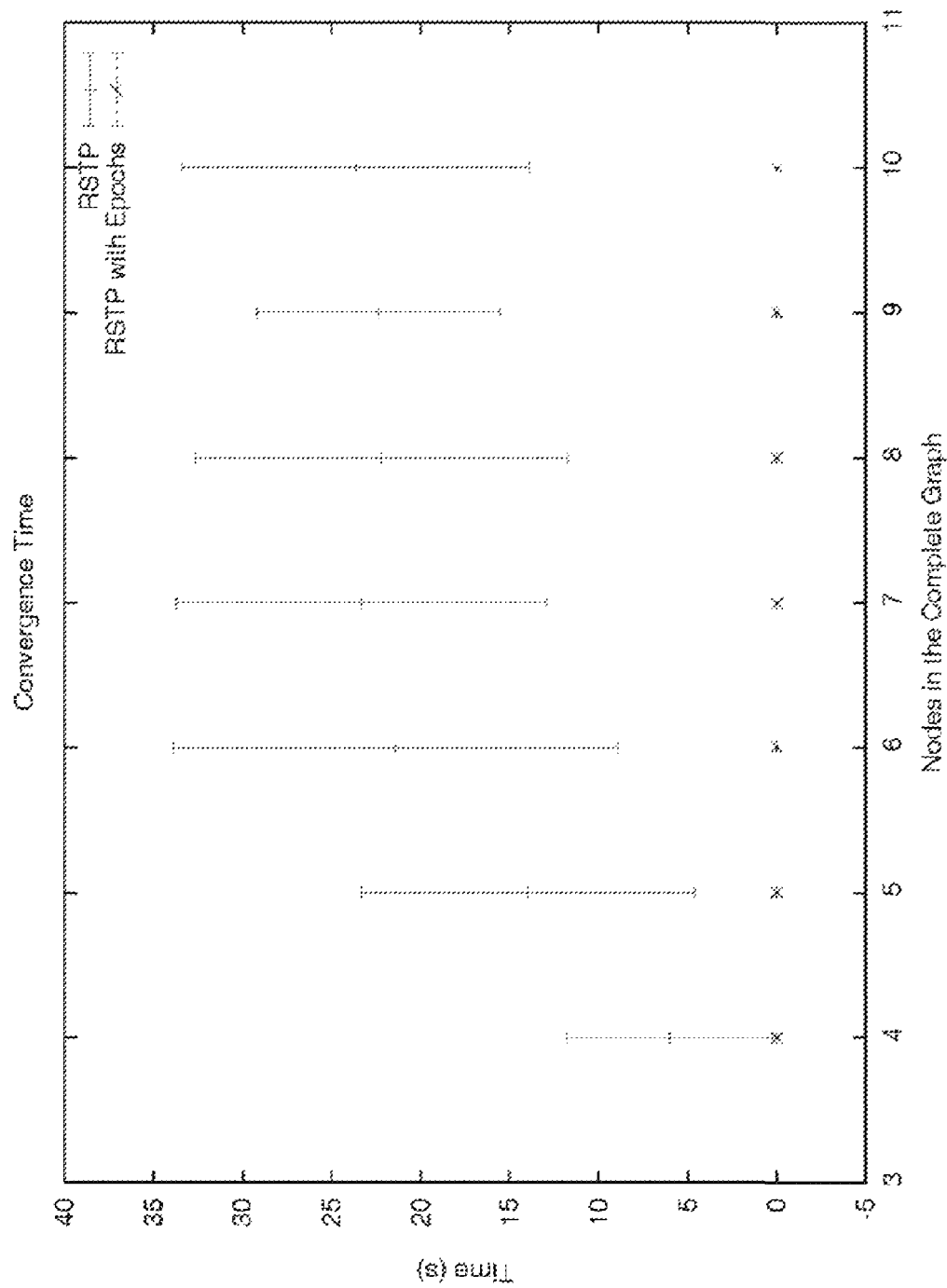
FIG. 10 is a graph of the convergence time after failure of the root in complete graph topologies of 4 to 10 bridges. Each experiment is run 100 times and the range of convergence times is shown.

In the first experiment we simulate a set of complete graphs, varying the number of bridges in the network. In each run we kill the root bridge and measure the time it takes for the network to converge under both protocols. FIG. 10 shows the convergence times measured. It presents bars representing the range of values measured for each network size. The x-axis is shifted downward to show that the convergence times for RSTP with Epochs is negligible compared to those of RSTP. In fact the highest convergence time observed for the RSTP with Epochs protocol is only 100 microseconds. This is because RSTP with Epochs does not suffer from the count to infinity problem and its convergence is only limited by the inherent network delay. On the other hand, RSTP takes much longer to converge. The variance in the convergence times for RSTP is due to the variability in the race conditions when count to infinity occurs.

Figures 2A, 2B:
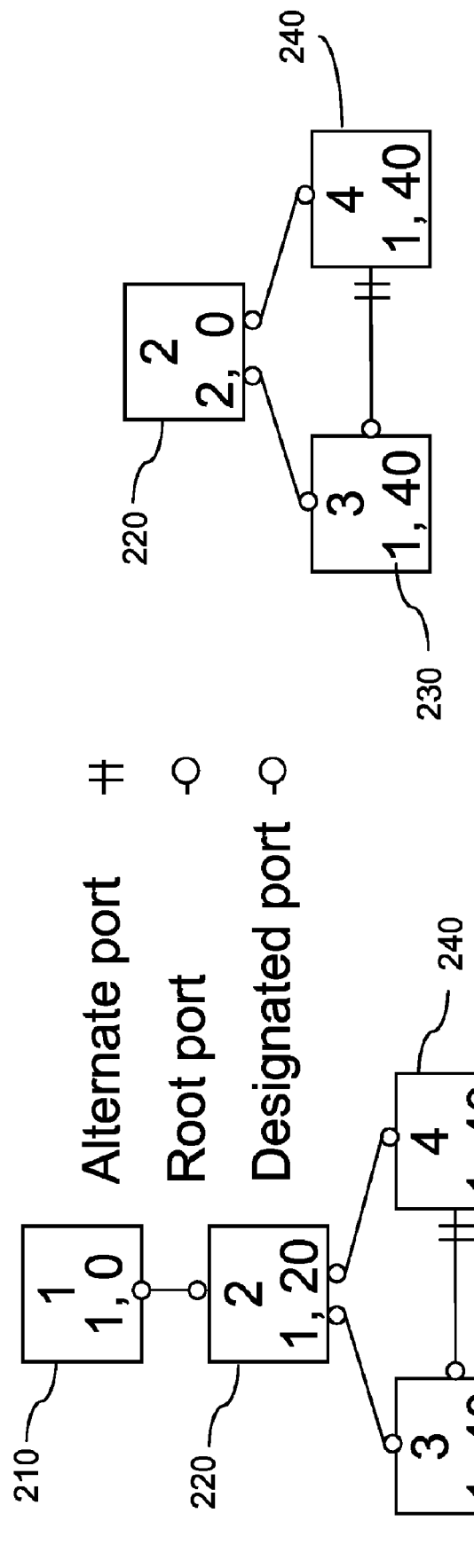
FIG. 2 illustrates an example of a count to infinity.
Figure 2D:
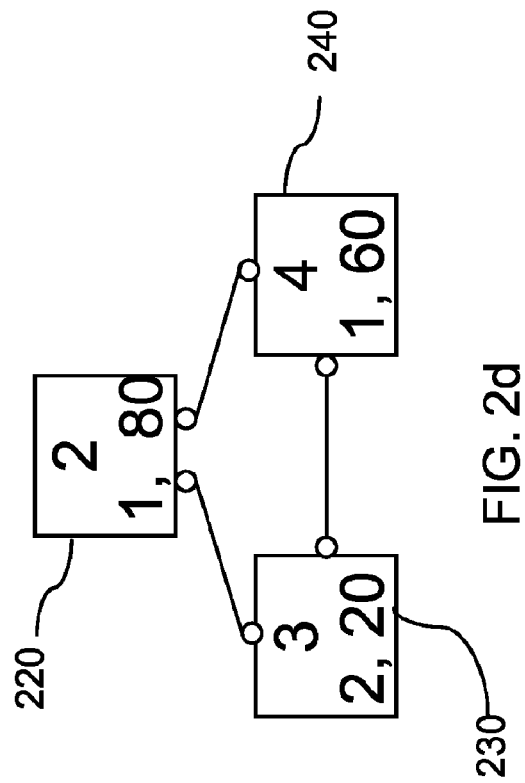
Figure 2C:
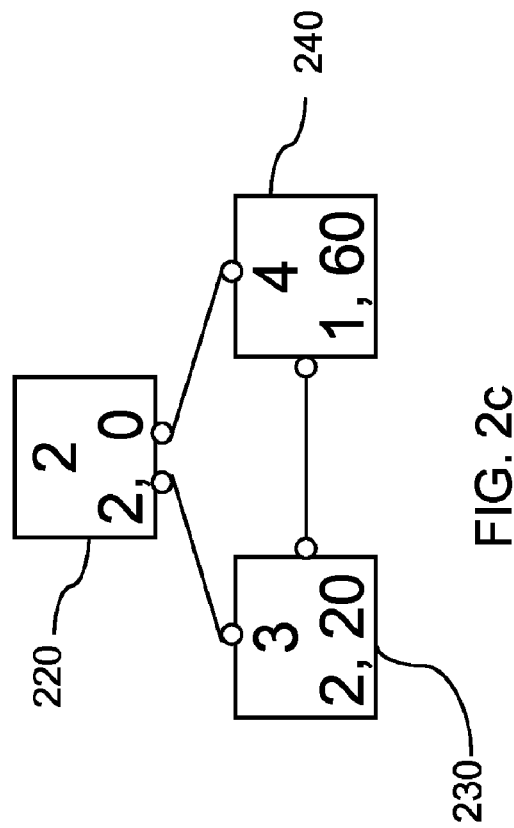
Figure 2F:
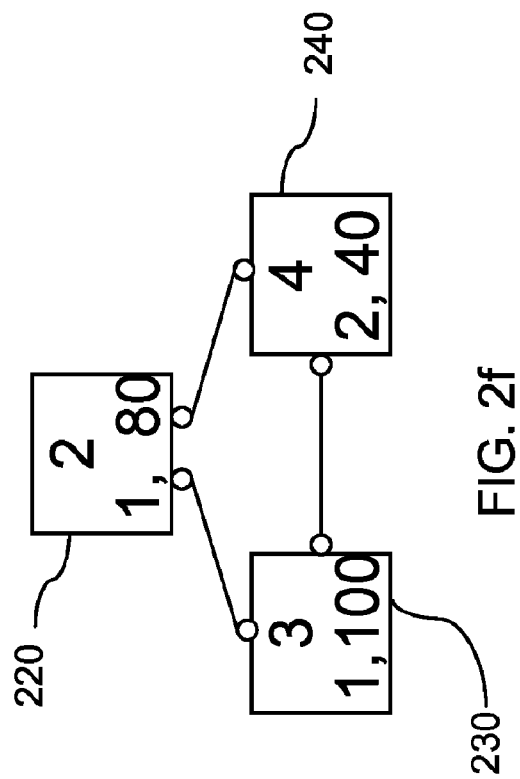
Figure 2E:
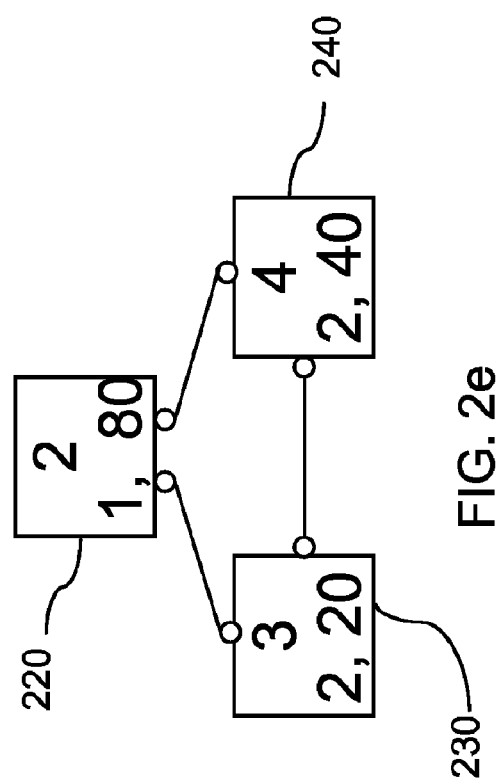
Figure 3:
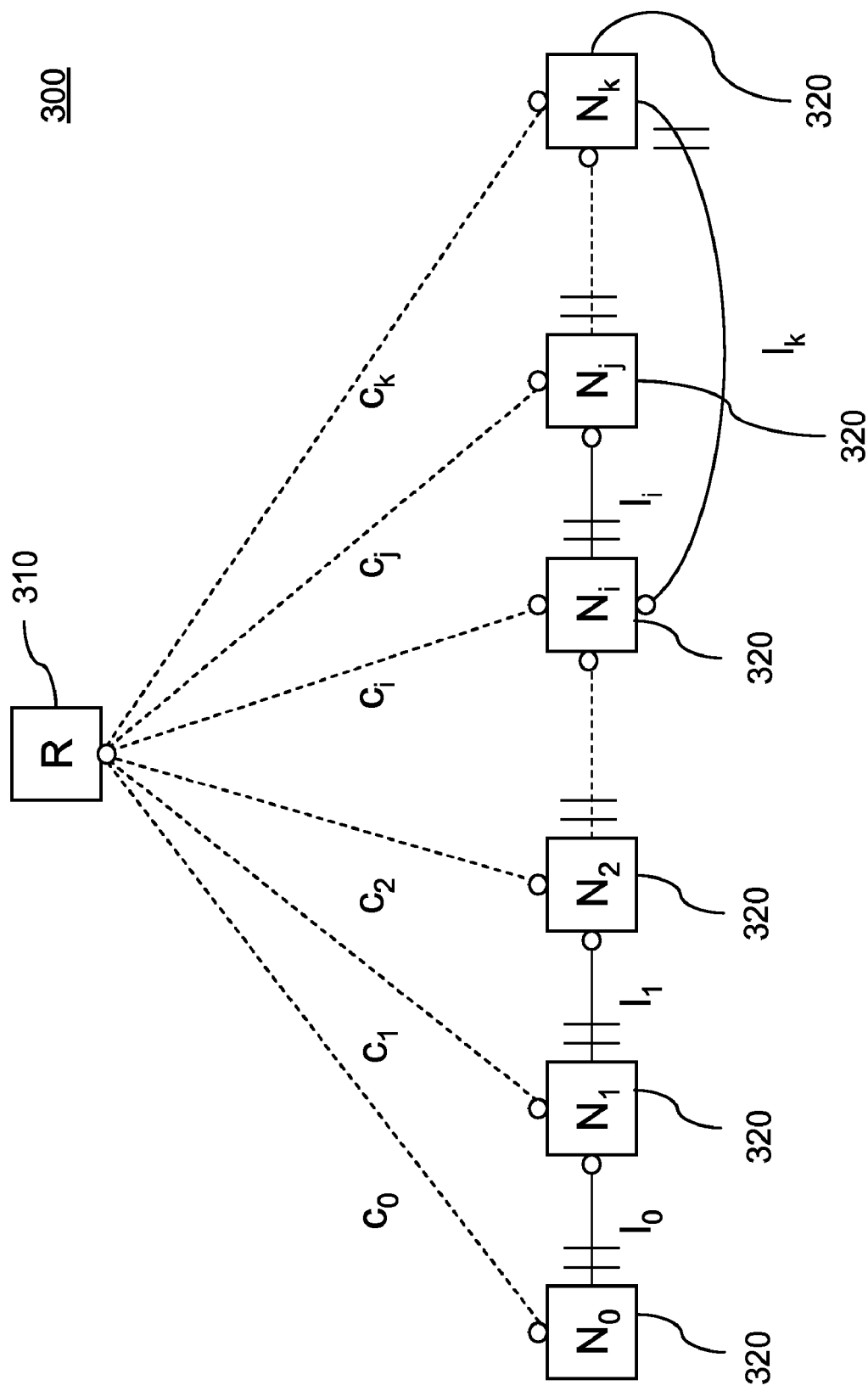
FIG. 3 shows the general network scenario considered in Lemma 1.
Figure 4:
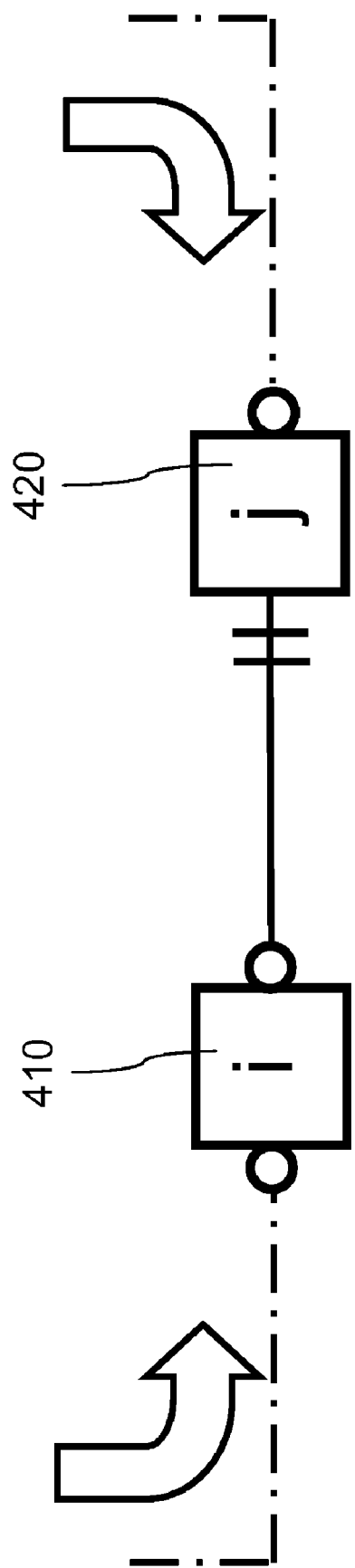
FIG. 4 is an illustration of the BPDU Race Condition.
Figure 5:
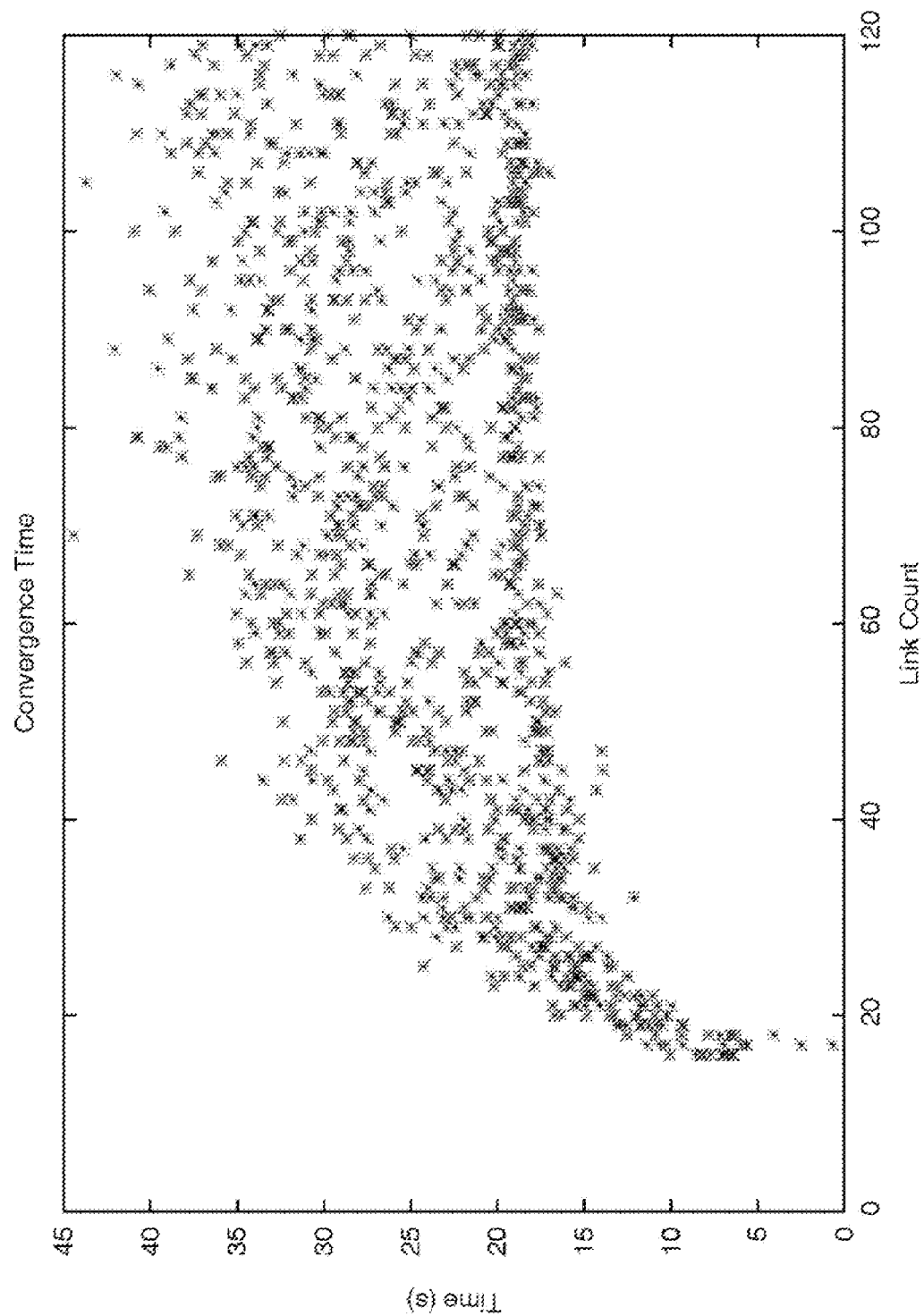
FIG. 5 is a graph of the convergence time in a network of 16 bridges after failure of the root.
Figure 6:
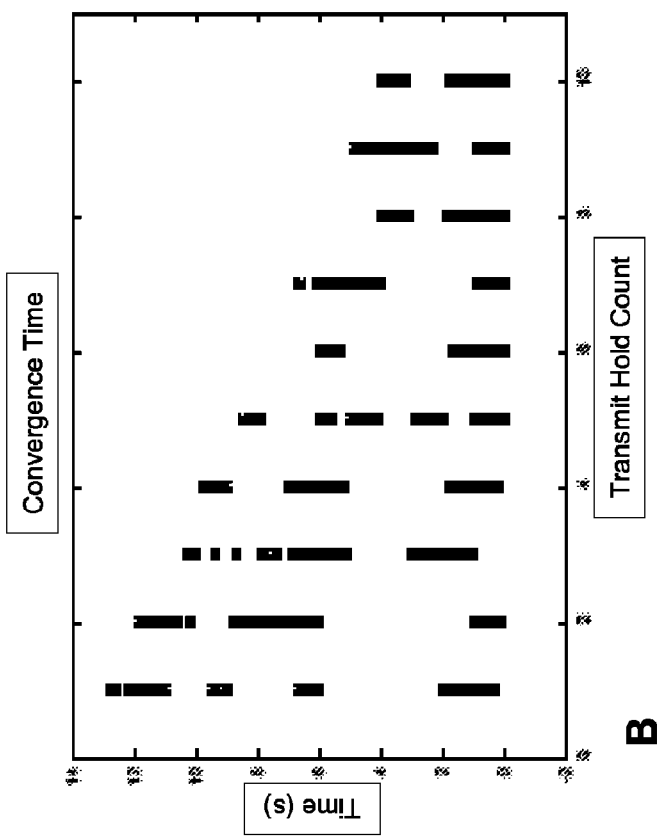
FIG. 6 shows two graphs of the convergence time after failure of the root varying the TxHoldCount. Graph A shows complete graph topology, 4 bridges. Graph B shows "Loop" topology, 4 bridges.
Figure 6:
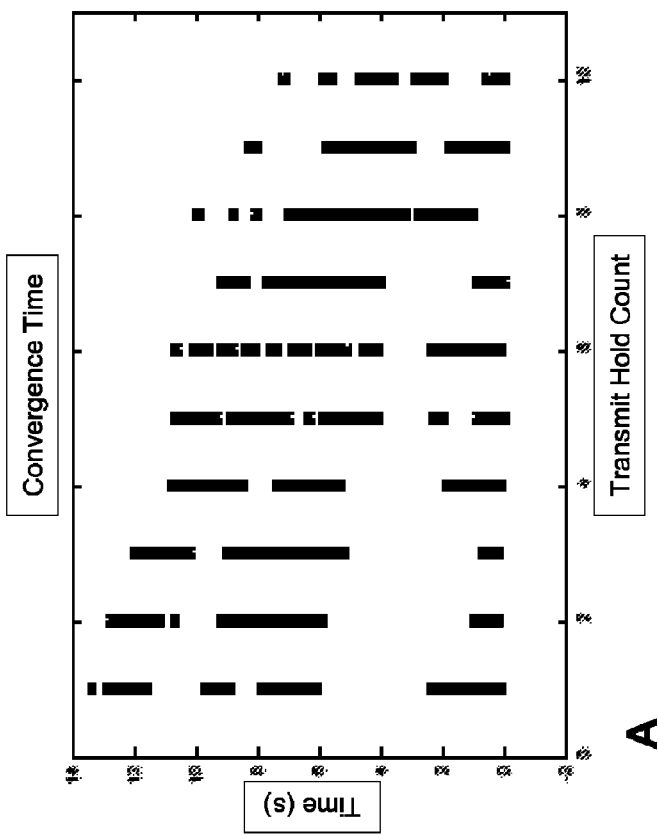
Figure 7:
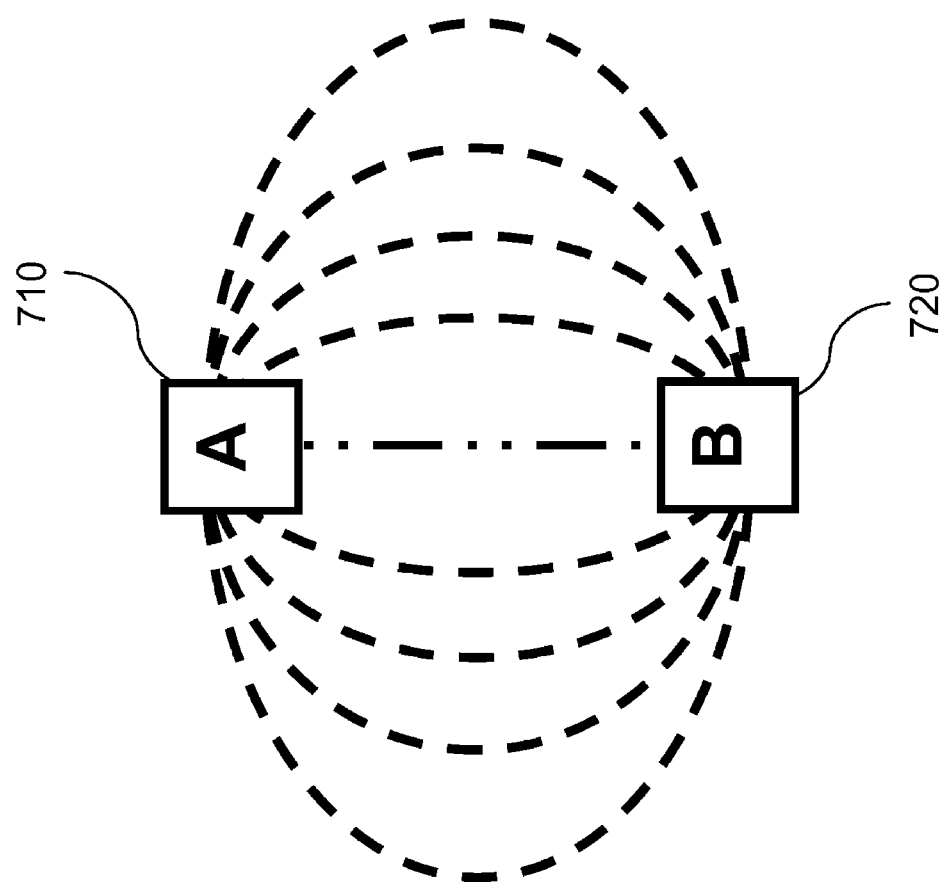
FIG. 7 illustrates a family of safe topologies of RSTP bridges.
Figure 11:
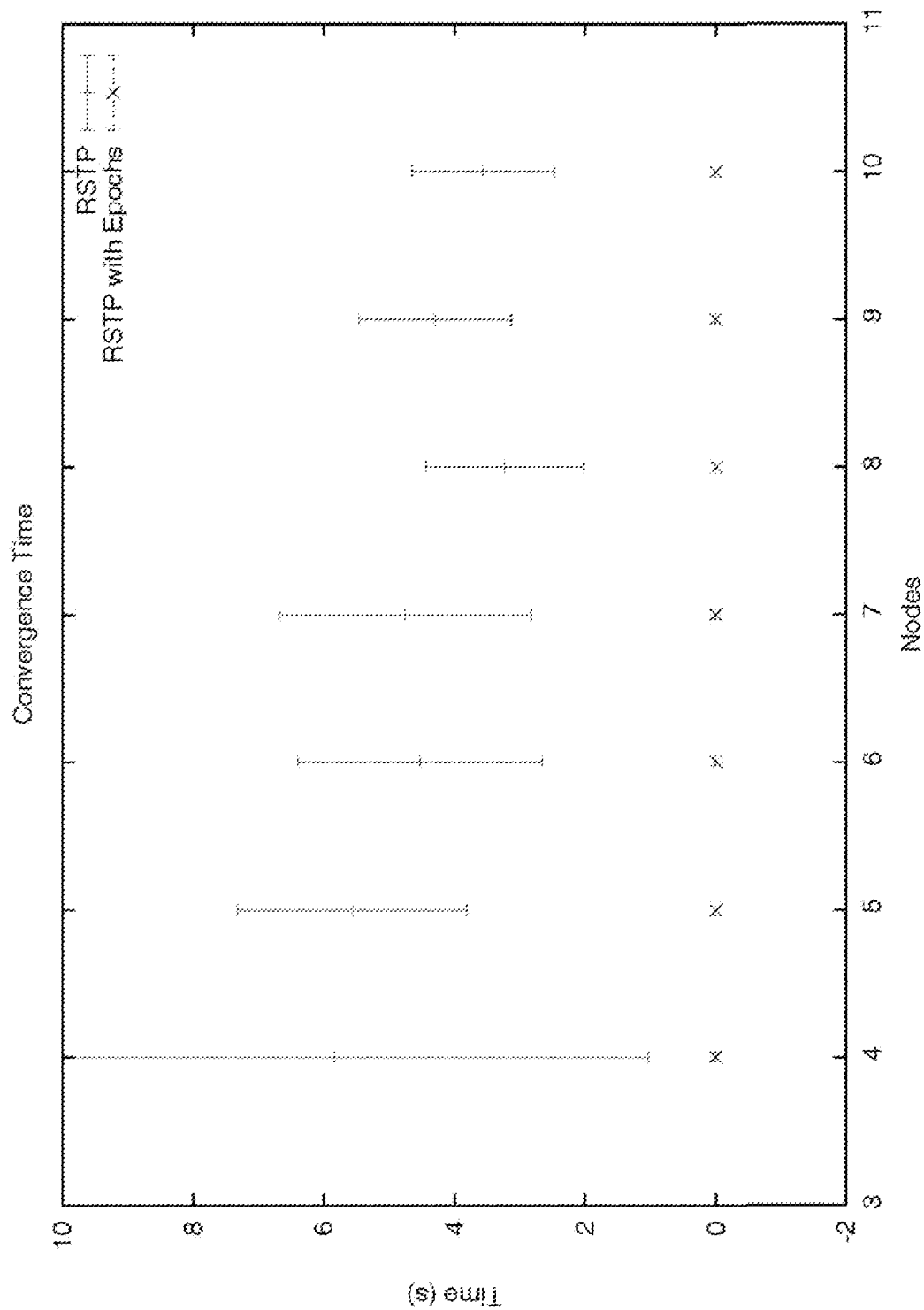
FIG. 11 is a graph of the convergence time after failure of the root in "loop" topologies of 4 to 10 bridges. Each experiment is run 100 times and the range of convergence times is shown.

In the second set of experiments we use simpler "loop" topologies, similar to the topology in FIG. 2(a) where we vary the total number of bridges in the loop. For example, a network with 10 bridges means the loop has 9 bridges and the loop is connected to the root bridge that does not lie on the loop. Like in the previous experiment we kill the root bridge and measure the convergence time for both protocols. FIG. 11 shows the convergence times measured. Again, RSTP with Epochs can converge in at most 400 microseconds in these experiments, but RSTP takes seconds to converge even under this simple network setting.

In the third set of experiments we use simple "ring" topologies where the bridges form a simple cycle. We take down the link connecting the root bridge (R) to a neighbor bridge (N). In RSTP, since N does not have any alternate ports, it will declare itself as root and start broadcasting its BPDU, the BPDU will flow through its descendants, invalidating the information at their root ports, until it reaches a bridge with an alternate port to the root. Since the alternate port caches superior information, the bridge will pick the alternate port as its root port and will send this new information back to N so it will eventually know that R is alive and accept it as its root. This means that N's BPDU will travel half way around the ring to reach the bridge with the alternate port, then the bridge with the alternate port will send a BPDU that will travel back to N, until N knows that R is alive.

Conversely in RSTP with Epochs, N will detect disconnection from the root, so it will send a BPDU with a higher sequence number than the last BPDU it has received from the root R. This will signal a new epoch to all bridges in the ring and they will accept N's BPDU as it has higher sequence number. Eventually N's BPDU will reach R after traveling all the way around the loop. R, knowing it is the legitimate root, will in response increase its sequence number and send a new BPDU to assert itself as the root. R's BPDU with the higher sequence number will make its way to N after traveling all the way back around the network which will make N accept R as its root.

Figure 12:
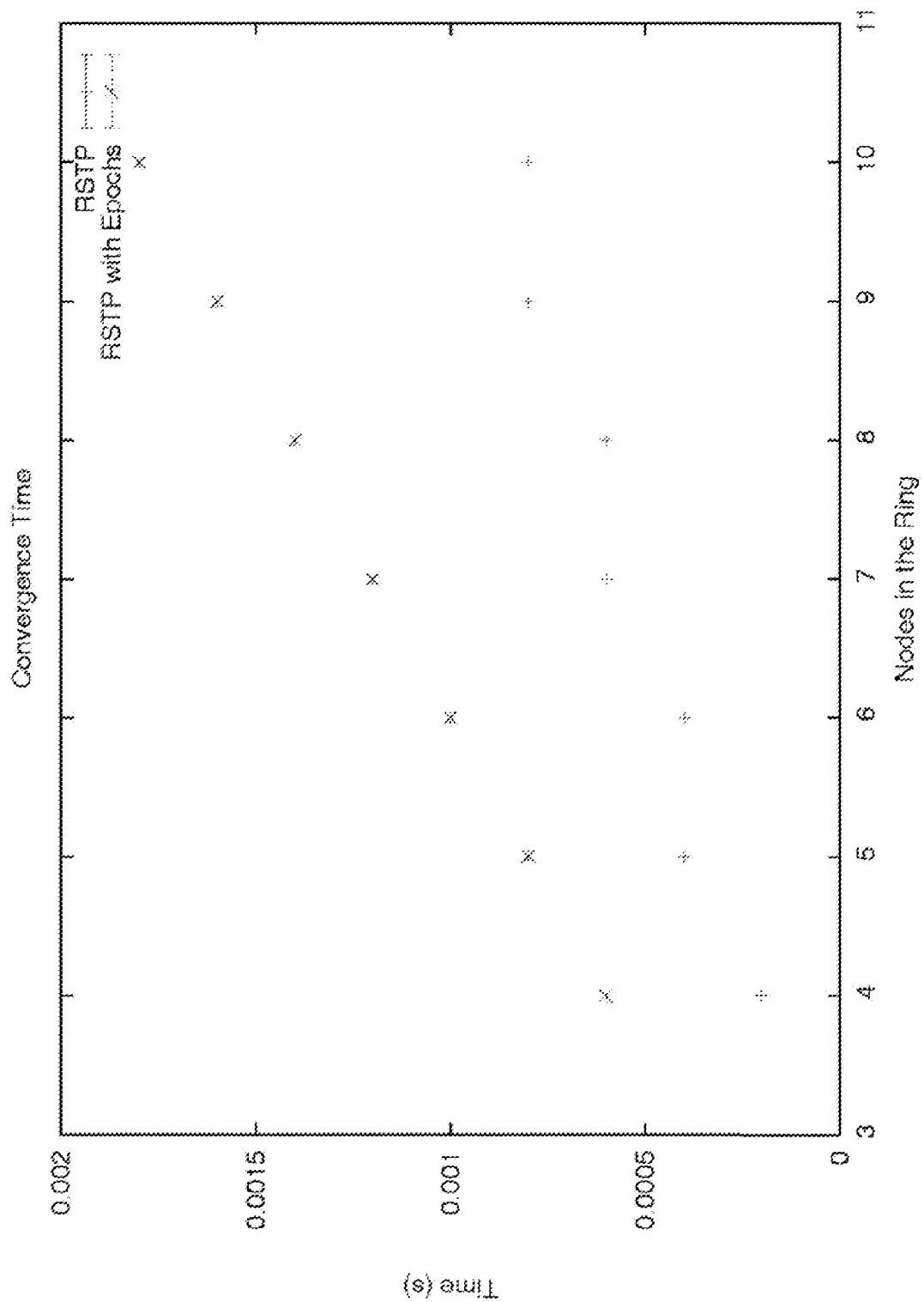
FIG. 12 is a graph of the convergence time after failure of a link connected to the ring topologies of 4 to 10 bridges. Each experiment is run 100 times and the range of convergence times is shown.

The effect of these different behaviors can be observed in FIG. 12 where RSTP with Epochs takes roughly twice the amount of time to converge compared to RSTP. Note that the convergence times for both protocols are very small in these experiments. In this experiment there is no variance in the results as there are no race conditions and thus the results are deterministic.

In this section we present experiments that illustrate the BPDU overheads of both RSTP and RSTP with Epochs protocols using the three families of topologies as used in Section V-B. In this set of experiments we present histograms plotting the total number of packets transmitted in the network within every tenth of a second. We exclude the packets transmitted to or from the root bridge as the root bridge dies at time 20 and we want to factor out the effects of having different number of bridges in the network before and after the death of the root bridge. Each histogram presents the packet transmissions in the network in a single experiment run.

Figure 13:
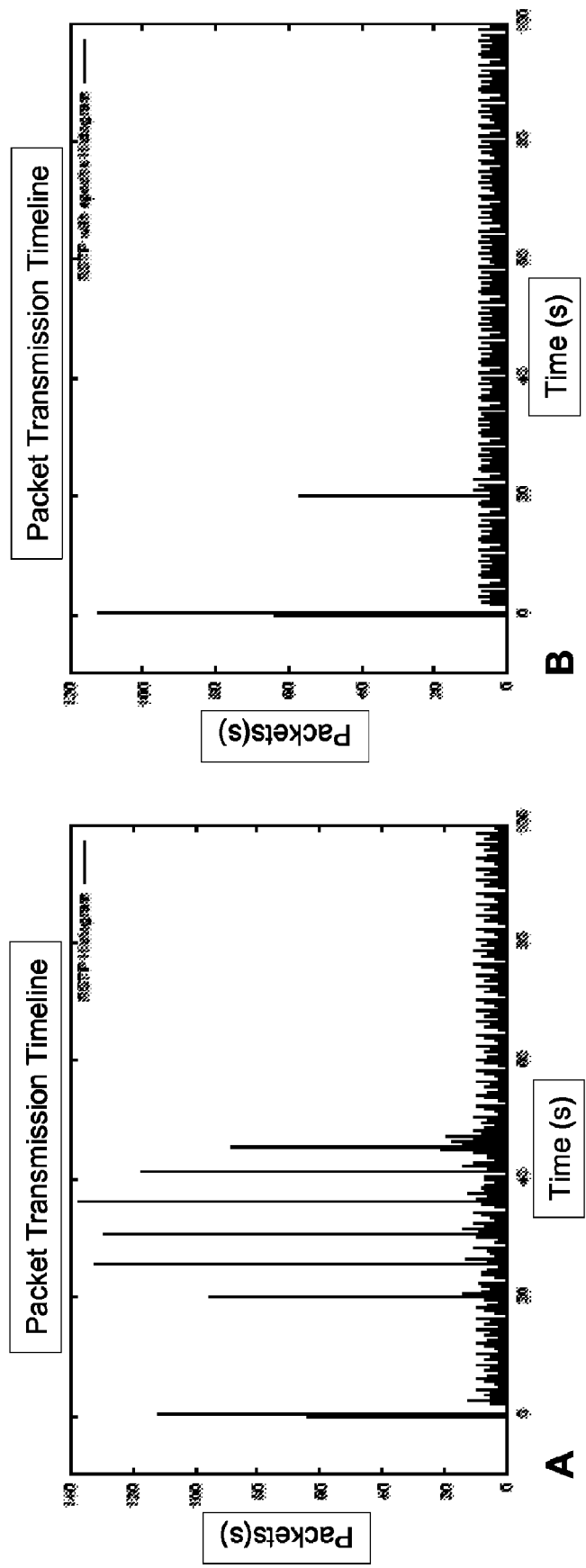
FIG. 13 shows two histograms of BPDU packet transmissions in a 10 bridge fully connected graph topology, each bin is 0.1 second. The root bridge dies at time 20. Histogram A is RSTP protocol. Histogram B is RSTP with Epochs.

In the first experiment we simulate a complete graph of 10 nodes. We kill the root bridge at time 20. FIG. 13(*a*) and FIG. 13(*b*) show the histograms of BPDUs transmitted for the RSTP and the RSTP with Epochs protocols respectively during a 100 second time span. For both protocols we observe a spike in the BPDUs transmitted at startup time. This is because at startup each bridge sends out its BPDU and keeps sending out any new superior information it receives until the bridges in the network agree on the same root and converge to the final spanning tree. After that the network goes into steady state where bridges only send the periodic hello message every hello time. At time 20, the root bridge dies. RSTP suffers from the count to infinity problem and sends out a lot of packets during a time span that exceeds 25 seconds until the network converges. RSTP with Epochs reacts differently to the failure of the root. There is an initial spike in the packets transmitted as the new information—of the death of the root and a new bridge asserting itself as the new root—flows throughout the network. Then the network converges almost instantaneously and BPDU transmission returns to steady state.

Figure 14:
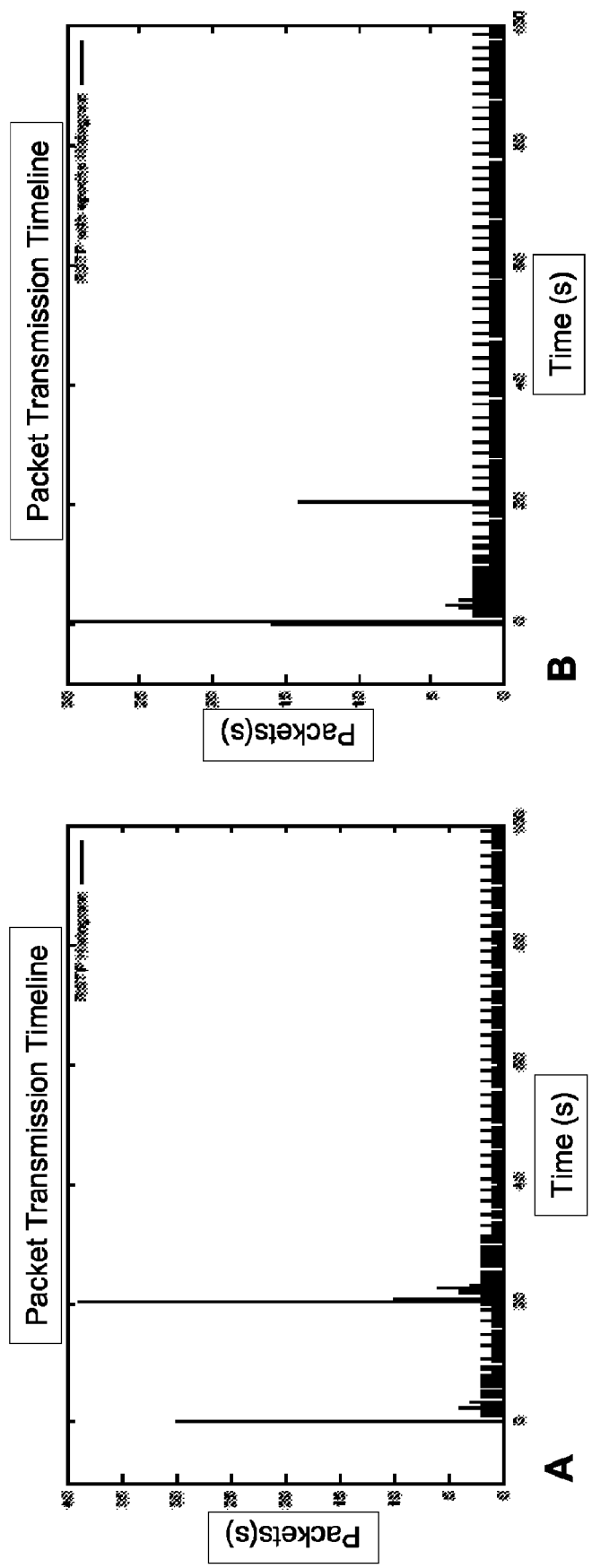
FIG. 14 shows two histograms of BPDU packet transmissions in a 10 bridge "loop" topology, each bin is 0.1 second. The root bridge dies at time 20. Histogram A is RSTP protocol. Histogram B is RSTP with Epochs.

In the second experiment we simulate a topology similar to that in FIG. 2(*a*) with 10 bridges, 9 of them are in the loop. We kill the root bridge at time 20. FIG. 14(*a*) and FIG. 14(*b*) show the histograms of BPDUs transmitted for the RSTP and the RSTP with Epochs protocols respectively during a 100 second time span. Again, for both protocols we observe a spike in the BPDUs transmitted at startup time. After that the network goes into steady state where bridges only send the periodic hello message every hello time. At time 20, the root bridge dies. Similar to the first experiment RSTP suffers from the count to infinity problem and sends out a lot of packets until the network converges. RSTP with Epochs converges almost instantaneously requiring much fewer BPDUs to converge.

Figure 15:
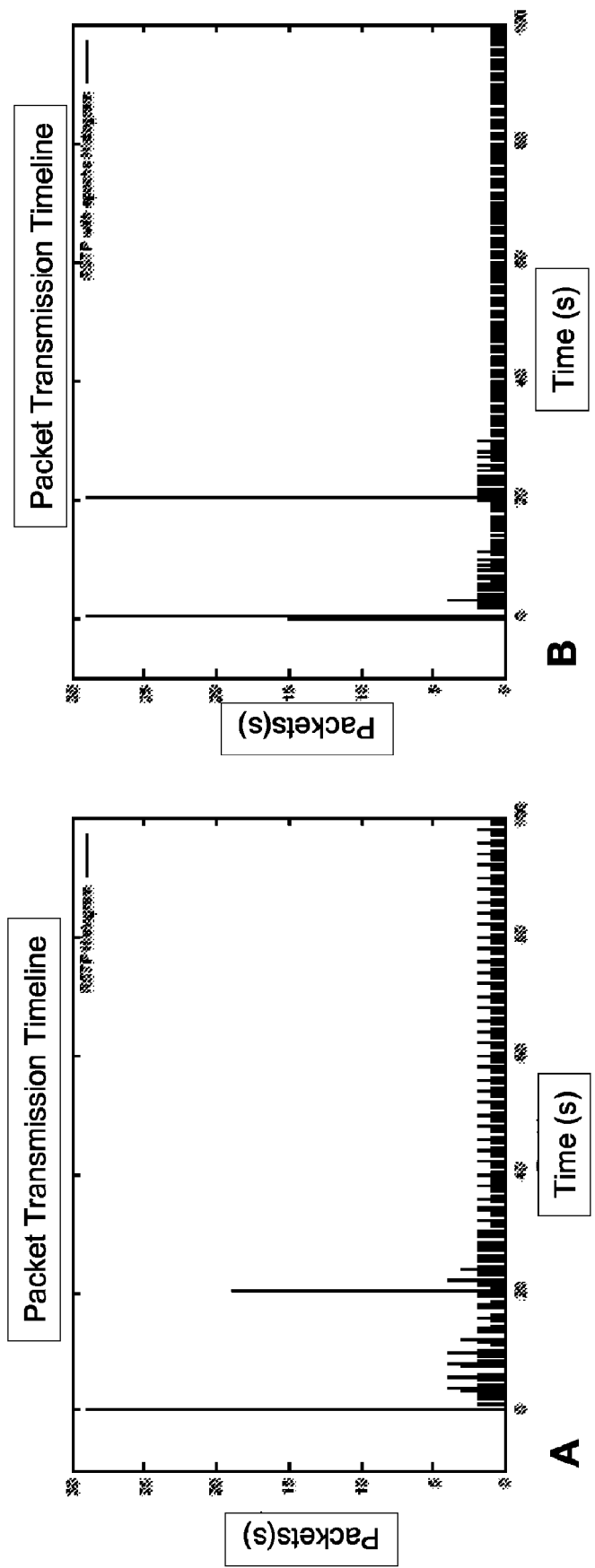
FIG. 15 shows two histograms of BPDU packet transmissions in a 10 bridge ring topology, each bin is 0.1 second. A link connecting the root bridge to a neighbor dies at time 20. Histogram A is RSTP protocol. Histogram B is RSTP with Epochs.

In the third experiment we simulate a 10 bridge ring topology. Similarly, we kill the link connecting the root bridge to a neighbor at time 20. FIG. 15(*a*) and FIG. 15(*b*) show the histograms of BPDUs transmitted for the RSTP and the RSTP with Epochs protocols respectively during a 100 second time span. In this experiment we observe that RSTP with Epochs uses more BPDUs than RSTP to recover from the failure. This because as explained in Section V-B, in RSTP with Epochs the disconnected bridge sends BPDU that traverses more hops than that in the case of the RSTP protocol.

In the three sets of experiments we note a short period of time after convergence where there is higher rate of packets being transmitted. This is because of the topology change events that result in an extra BPDU getting transmitted through each bridge's root port every HelloTime and this lasts during the duration of the topology change timer.

In this subsection we study port saturation of both protocols in the event of failure using the three families of topologies as used in the previous experiments. A port is said to be saturated if it has reached its TxHoldCount limit but still has more BPDUs to transmit. We present a time sequence of the number of saturated ports in the whole network in the three experiment scenarios presented in Section V-C.

Figure 16:
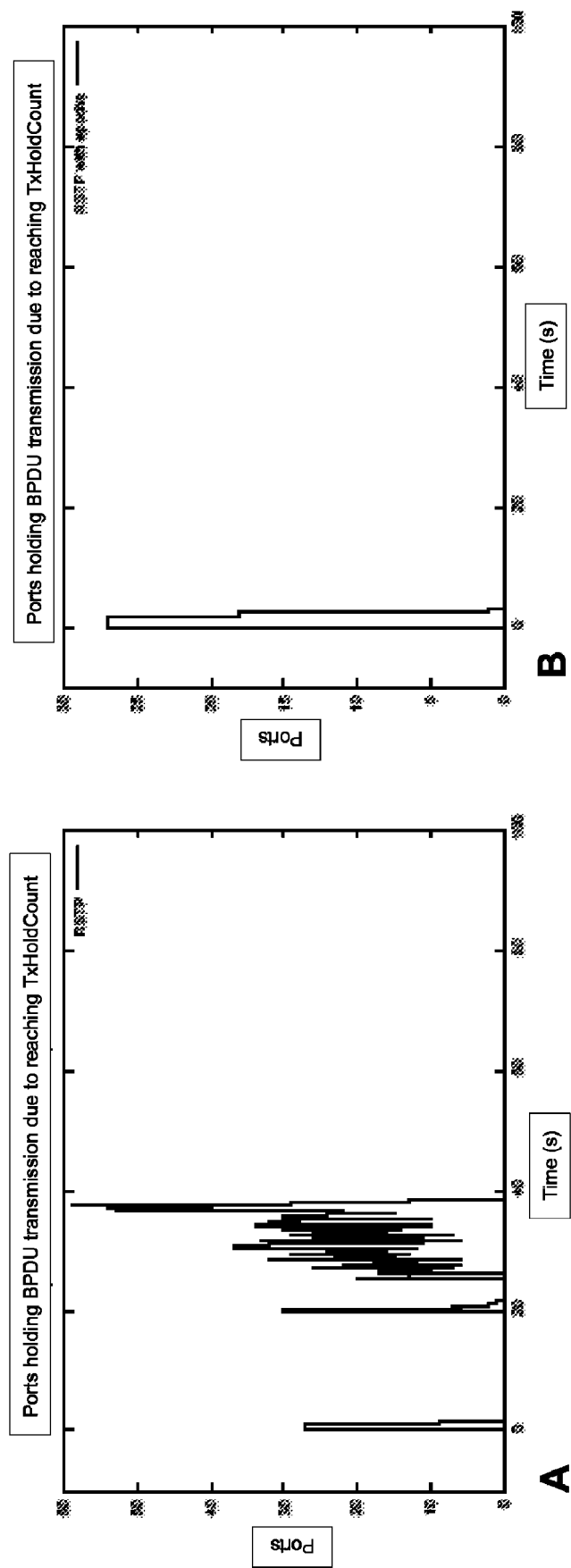
FIG. 16 shows two histograms of the time sequence of number of ports that have reached their TxHoldCount limit while they still have more BPDUs waiting for transmission. This experiment is for a 10 bridge fully connected graph topology where the root bridge dies at time 20. Histogram A is RSTP protocol. Histogram B is RSTP with Epochs.

In the first experiment simulating a complete graph of 10 nodes we observe in FIG. 16 a spike in the number of saturated ports at startup due to the spike in transmitted BPDUs at startup by both protocols. However starting from time 20 when the root port dies, we find a long period of time that is close to 20 seconds in the RSTP protocol where the network has many saturated ports. This is due to the count to infinity problem where BPDUs spin around the loop causing the ports to quickly reach their TxHoldCount limit. RSTP with Epochs does not suffer from the count to infinity problem, thus the ports do not get saturated after the failure.

Figure 17:
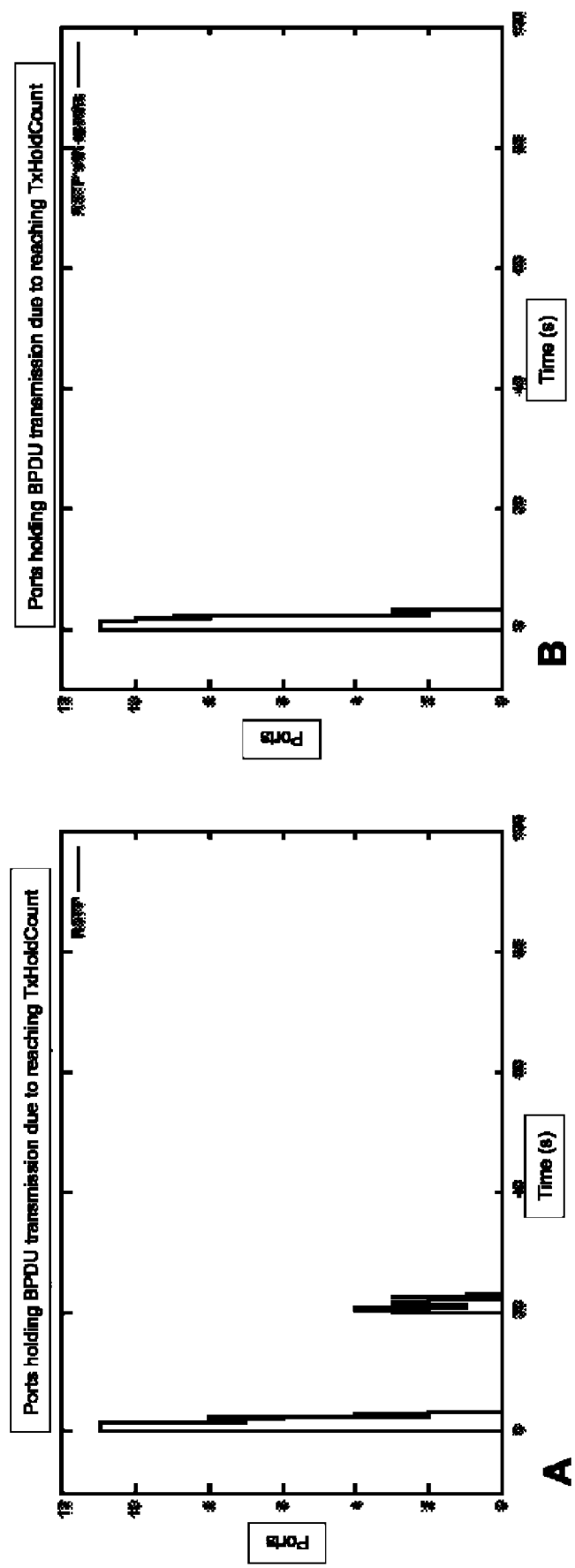
FIG. 17 shows two histograms of the time sequence of number of ports that have reached their TxHoldCount limit while they still have more BPDUs waiting for transmission. This experiment is for a 10 bridge "loop" topology. The root bridge dies at time 20. Histogram A is RSTP protocol. Histogram B is RSTP with Epochs.

Similarly, in the second experiment-simulating a topology like that in FIG. 2(*a*) with 10 bridges—we observe in FIG. 17 a spike in the number of saturated ports at startup. We also observe in the RSTP protocol a period after the failure of the root bridge where there are several saturated ports. Again this is because of the count to infinity problem.

Figure 18:
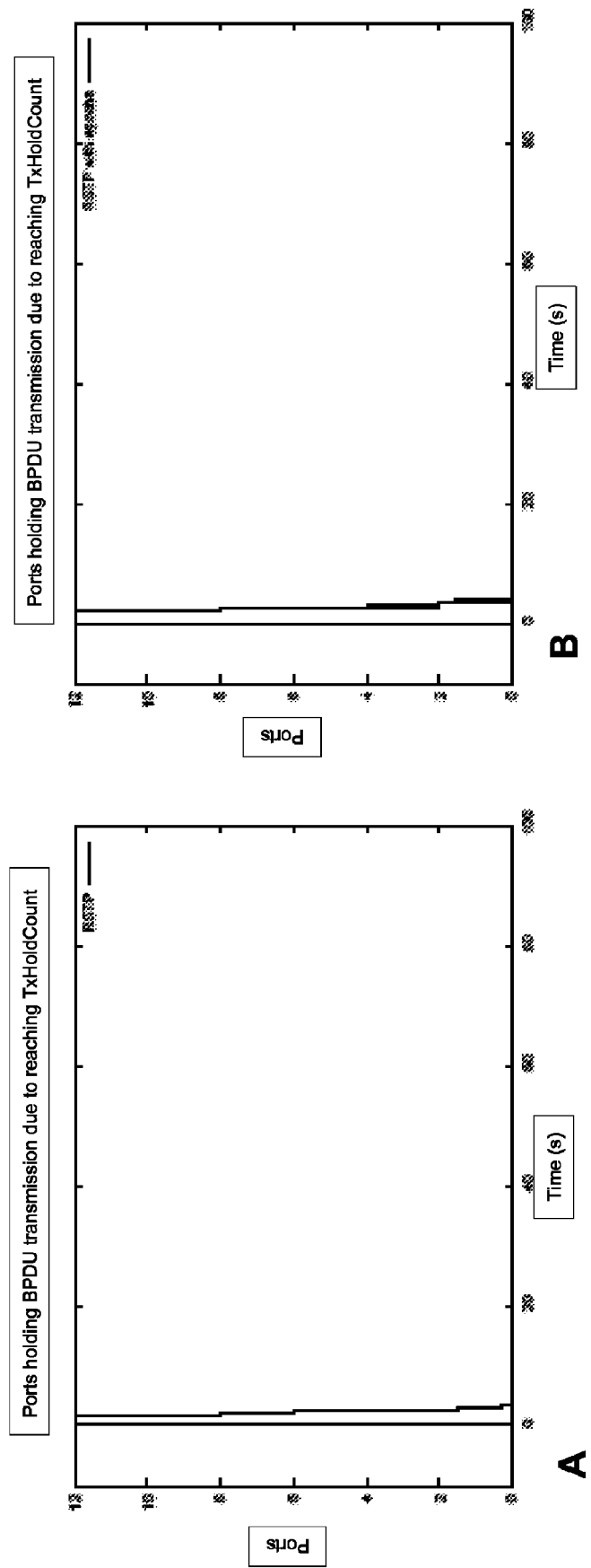
FIG. 18 shows two histograms of the time sequence of number of ports that have reached their TxHoldCount limit while they still have more BPDUs waiting for transmission. This experiment is for a 10 bridge ring topology where a link connecting the root bridge to a neighbor dies at time 20. Histogram A is RSTP protocol. Histogram B is RSTP with Epochs.

In the third experiment simulating a ring topology, failure of the root cuts the loop so there is no count to infinity. Thus for both protocols no ports get saturated after the failure as can be seen in FIG. 18.

Figure 19A:
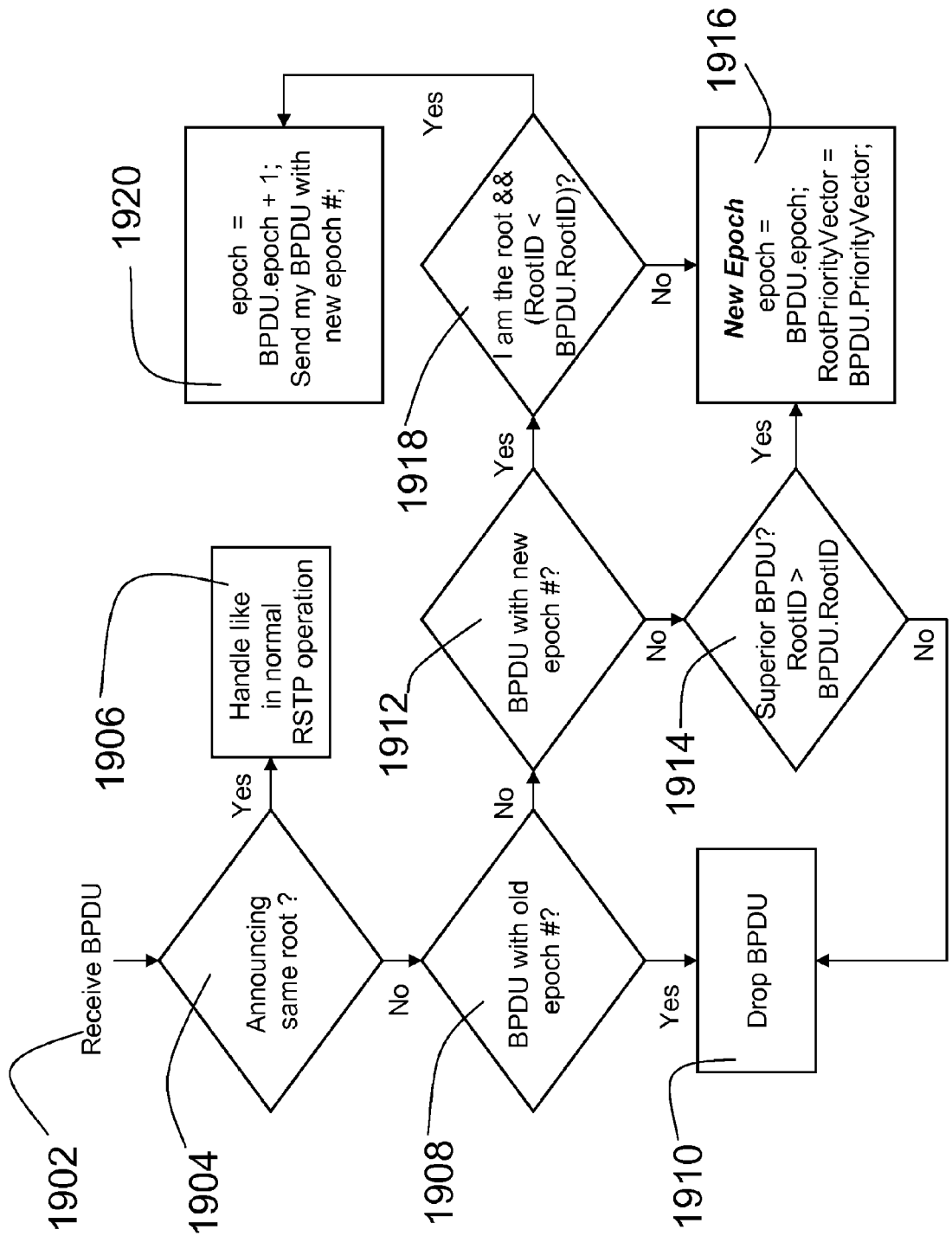
FIGS. 19(a) and (b) are flow diagrams of an alternate embodiment of the present invention.
Figure 19B:
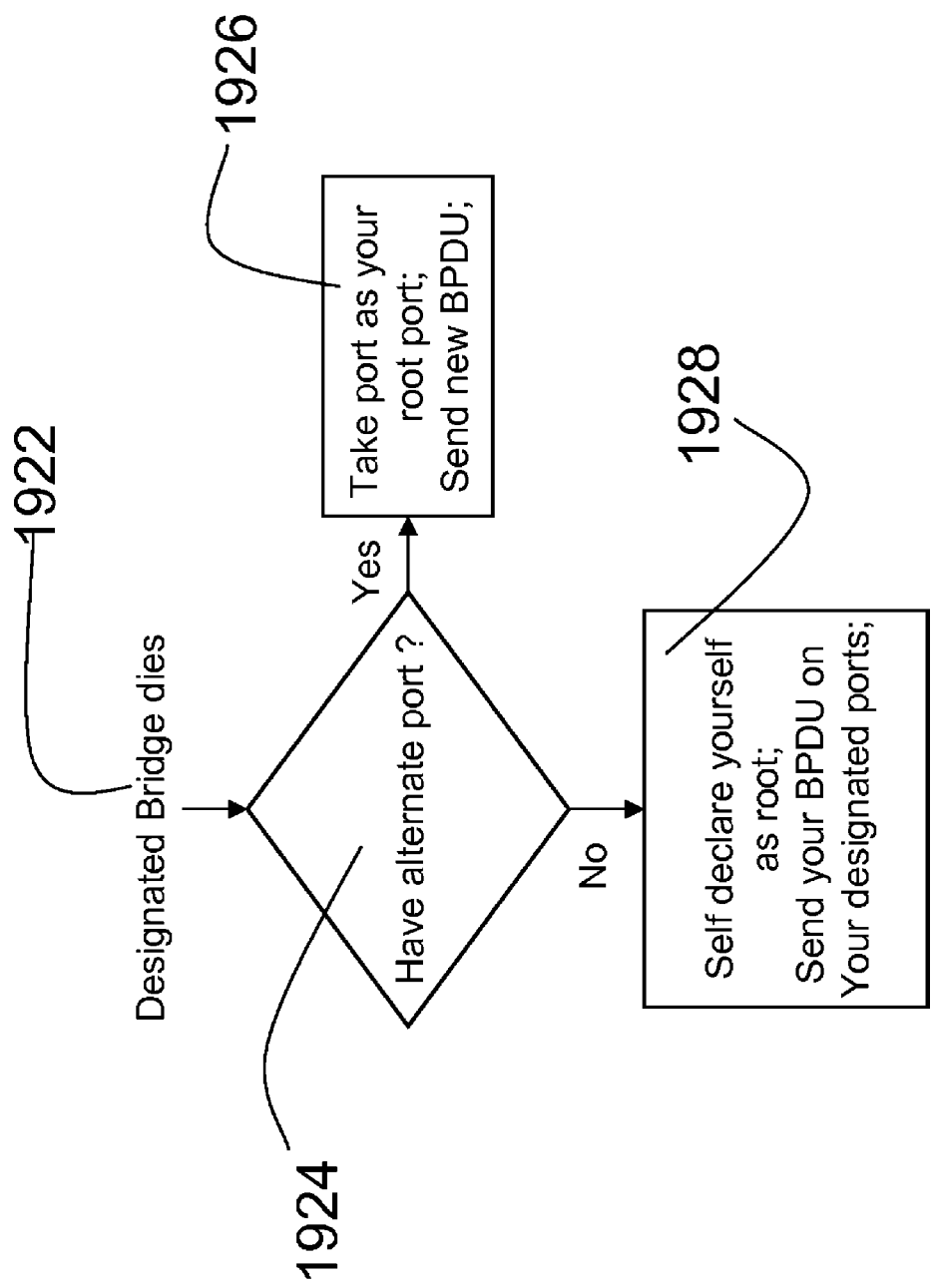

In another embodiment, RSTP with Epochs can be implemented using epoch numbers rather than sequence numbers, as shown in FIGS. 19(*a*) and (*b*). The protocol will still be very similar to the embodiment discussed previously. The root bridge starts sending its BPDUs including an epoch number that does not change across BPDUs as long as the root bridge has not lost its root status. Bridges maintain the current epoch number and if they receive BPDUs with an older epoch, they drop such BPDUs. When a bridge receives a BPDU at step 1902, the bridge will determine whether the BPDU has the same root previously known to that bridge at step 1904. If the BPDU has the same root, the bridge will handle the BPDU as it would be handled in normal RSTP operation at step 1906. If the root of the received BPDU is different than the root previously known to the bridge, at step 1908 the bridge will compare the BPDU epoch number to the epoch number previously stored in the bridge. If the epoch number of the BPDU is older than the stored epoch number, the bridge will drop the BPDU at step 1910. If the BPDU epoch number is not older, at step 1912 the bridge will determine whether the epoch is new or is the same as the stored epoch number. If the BPDU epoch number is the same as the stored epoch number, at step 1914 received BPDU belonging to the same epoch is compared to the stored information based on its priority vector. If the stored root ID is greater than the root ID of the received BPDU, the bridge will change its stored epoch number to the epoch number of the received BPDU and change its stored root ID (or vector) to the root ID of the received BPDU. If the stored root ID is not less than the root ID of the received BPDU, the BPDU will be dropped as being stale. If at step 1912 the BPDU is found to have a new epoch number, a determination is made at step 1918 whether the stored root ID is less than the root ID of the received BPDU. If the stored root ID is less than the root ID of the received BPDU, the bridge will change the stored epoch number to the epoch number of the received BPDU+1 and send its BPDU with the new epoch number at step 1920. If the stored root ID is not less than the root ID of the received BPDU, the bridge will change its stored epoch number to the epoch number of the received BPDU and change its stored root ID (or vector) to the root ID of the received BPDU. Thus, the bridge with the least bridge ID in the same epoch will win root status.

When a bridge loses its connection to the root bridge at step 1922, it determines whether it has an alternate port at step 1924. If it does have an alternate port, it takes the alternate port as its root port at step 1926 and sends a new BPDU. If it does not have an alternate port, it self proclaims itself as the new root at step 1928. It starts sending its BPDUs using a new epoch number larger than the previous epoch number used by the previous root bridge. If the old root is still reachable, it will receive the new root's BPDUs with the new epoch number. Since the old root must have a lower bridge ID, so it must be the true root. In response, the old root increases its epoch number more than the epoch number the new root bridge is using and starts sending its BPDUs. This allows the old root bridge to reassert itself as the root of the network. As with the sequence numbers described above, the epoch numbers can wrap-around.

At various points in the descriptions of the embodiments above, reference has been made to the sequence or epoch numbers increasing or having 1 added thereto to designate a new epoch. Such references to what made be referred as ascending methods of designating epochs have been made for the convenience of the description, as it will be apparent to those of skill in the art that various other methods, for example, descending epoch or sequence numbers, may be used to designate newer or "superior" epochs or distinguish newer epochs from older or "inferior" epochs.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A method for preventing a count-to-infinity problem in a network having a plurality of network bridges, the method comprising the steps of:

sending periodic messages from a root bridge, wherein each said periodic message sent by said root bridge comprises a sequence number and said root bridge increments said sequence number at a beginning of each period;

receiving a message at a network bridge, said network bridge having stored in memory a first sequence number received from said root bridge, a last sequence number received from said root bridge and a root priority vector comprising a current root identifier, said current root identifier comprising an identifier of said root bridge and said received message comprising a message sequence number and a message priority vector comprising a message root identifier, said message root identifier being different than said current root identifier; and determining whether said received message is stale by comparing said message root identifier to said current root identifier and comparing said message sequence number to said first sequence number.

2. A method according to claim 1, wherein if said message root identifier equals said current root identifier, said network bridge stores said message sequence number as said last sequence number and said network bridge handles said received message in normal RSTP operation.

3. A method according to claim 1, wherein said message comprises a bridge protocol data unit (BPDU).

4. A method according to claim 1, further comprising the step of:

discarding said message if said message sequence number is less than said first sequence number.

5. A method according to claim 1, further comprising the step of:

comparing said message sequence number to said last sequence number if said message sequence number is superior to or equal to said first sequence number.

6. A method according to claim 1, wherein said network bridge claims itself to be a root bridge by storing a new last sequence number superior to any message sequence number previously received by said network bridge and transmitting a message comprising said new last sequence number.

7. A method according to claim 1, wherein said message sequence numbers wrap-around.

8. A method according to claim 5, further comprising the step of:

comparing said message root identifier to said current root identifier if said message sequence number is inferior to or equal to said last sequence number.

9. A method according to claim 5, further comprising the step of:

comparing said message root identifier to said current root identifer if said message sequence number is superior to said last sequence number; and storing a new first sequence number equal to said message sequence number, a new last sequence number equal to said message sequence number, and a new root priority vector equal to said message priority vector if said message root identifier is superior to or equal to said current root identifier or if said network bridge is not a root bridge.

10. A method according to claim 5, further comprising the step of:

comparing said message root identifier to said current root identifier if said message sequence number is superior to said last sequence number; and storing a new last sequence number superior to said message sequence number if said message root identifier is not superior to said current root identifier and if said network bridge is a root bridge; and discarding said received message, generating a new message with said new last sequence number and transmitting said new message.

11. A method according to claim 8, further comprising the step of:

discarding said message if said message root identifier is not superior to said current root identifier.

12. A method according to claim 8, further comprising the step of:

storing a new first sequence number equal to said message sequence number, a new last sequence number equal to said message sequence number, and a new root priority vector equal to a message root priority vector if said message root identifier is superior to said current root identifier.

13. A method for preventing a count-to-infinity problem in a network having a plurality of network bridges comprising the steps of:
- receiving a Bridge Protocol Data Unit message at a network bridge, said network bridge having stored in memory a current epoch number and a root priority vector comprising a current root identifier and said received message comprising a message epoch number and a message priority vector comprising a message root identifier, said message root identifier being different than said current root identifier; and
- comparing said message epoch number to said current epoch number;
- dropping said message if said message epoch number is older than said stored epoch number;
- comparing said current root identifier to said message root identifier if said message epoch number is not older than said current epoch number;
- dropping said message if said message epoch number is equal to said current epoch number and said current root identifier is superior to said message root identifier;
- changing said root priority vector to said message priority vector if said message epoch number is equal to said current epoch number and said message root identifier is superior to said current root identifier;
- changing said current epoch number to said message epoch number and changing said root priority vector to said message priority vector if said message epoch number is newer than said current epoch number and either said message root identifier is superior to said current root identifier or said network bridge is not a root bridge; and
- changing said current epoch number to a new epoch number, changing said current root priority vector to said message priority vector, discarding said received message, generating a new message with said new current epoch number and transmitting said new message if said message epoch number is newer than said current epoch number, said current root identifier is superior to said message root identifier, and said network bridge is a root bridge.

14. A method according to claim 13, wherein said network bridge claims itself to be a root bridge by storing a new current epoch number superior to any message epoch number previously received by said network bridge and transmitting a message comprising said new current epoch number.

15. A method according to claim 13, wherein said new epoch number is superior to any epoch number of any message previously received by said network bridge.

16. A method according to claim 13, wherein said message epoch numbers wrap-around.

\* \* \* \* \*